(12) United States Patent
Takayama et al.

(10) Patent No.: US 6,844,085 B2
(45) Date of Patent: Jan. 18, 2005

(54) COPPER BASED SINTERED CONTACT MATERIAL AND DOUBLE-LAYERED SINTERED CONTACT MEMBER

(75) Inventors: Takemori Takayama, Hirakata (JP); Tetsuo Ohnishi, Yawata (JP); Yoshikiyo Tanaka, Hirakata (JP); Keiichi Maeda, Hirakata (JP); Kan'ichi Sato, Hirakata (JP)

(73) Assignee: Komatsu Ltd; JPX ( * ) Notice: Subject to any disclaimer, the term of this patent is extended or adjusted under 35 U.S.C. 154(b) by 0 days.

(21) Appl. No.: 10/193,625

(22) Filed: Jul. 12, 2002

(65) Prior Publication Data

US 2003/0099853 A1 May 29, 2003

(30) Foreign Application Priority Data

Jul. 12, 2001 (JP) .................................... 2001-212172
May 10, 2002 (JP) .................................... 2002-135275

(51) Int. Cl.[7] ..................... B32B 15/20; B32B 15/02; B22F 7/00; C22C 1/05
(52) U.S. Cl. ................. 428/674; 428/676; 428/621; 428/627; 428/632; 384/912; 384/910; 384/913; 75/247
(58) Field of Search ................. 428/674, 676, 428/621, 627, 632; 384/912, 910, 913; 75/247

(56) References Cited

U.S. PATENT DOCUMENTS

| | | | |
|---|---|---|---|
| 5,540,750 A | | 7/1996 | Fernandez et al. |
| 5,948,549 A | * | 9/1999 | Takayama et al. ........... 428/676 |
| 6,015,775 A | * | 1/2000 | Takayama et al. ........... 508/103 |
| 6,428,744 B1 | * | 8/2002 | Takayama et al. ............. 419/2 |
| 6,613,121 B2 | * | 9/2003 | Takayama et al. ............ 75/247 |

FOREIGN PATENT DOCUMENTS

| | | |
|---|---|---|
| JP | 07-166278 | 6/1995 |
| JP | 10-001704 | 1/1998 |
| JP | 11-350008 | 12/1999 |
| WO | WO 94/00609 | 1/1994 |

OTHER PUBLICATIONS

"Ceramic Data Book 76" ("Industries and Products" No. 59) 1976, Takashi Hanazawa.
"Powder and Powder Metallurgy", 31, p. 290 (1984), written by Tsukamoto, Takahashi, Komai, Hayama et al.
"Journal of the Japan Society for Composite Materials", vol. 3, No. 1, 1997, Takashi Hanazawa.
"Engineering Data Book for Copper based Alloy Casting", (pp134–155), edited by Japan Non-ferrous Metal Casting Association issued by Materials Process Technology Center (Sokeizai Center) Jul. 30, 1998.
"Powder and Powder Metallurty", 31, p. 290 (1984), written by Tsukamoto, Takahashi, Komai, Hayama et al.

* cited by examiner

Primary Examiner—Deborah Jones
Assistant Examiner—Jason L Savage
(74) Attorney, Agent, or Firm—Rader, Fishman & Grauer PLLC

(57) ABSTRACT

With the objectives of alleviating the property of attacking on the mating member by scratching-off of local agglutinates on the sliding contact surface, achieving improved wear resistance, and achieving improved seizure resistance through restraint of frictional heat generation by a hard phase, a copper based sintered contact material contains shock-resistant ceramics in an amount of 0.05 to less than 0.5 wt % as non-metallic particles composed of one or more substances selected from pulverized oxides, carbides and nitrides. The shock-resistant ceramics are comprised of $SiO_2$ and/or two or more substances selected from $SiO_2$, $Al_2O_3$, $LiO_2$, $TiO_2$ and MgO.

15 Claims, 8 Drawing Sheets

FIG. 3
THE STRUCTURES OF Cu-Ni-Si BASED SINTERED COMPACTS
(A MAGNIFICATION OF ×400)
(SINTERING CONDITION 1100°C × 1HR)
a) Cu-3Ni-1Si    25 μm
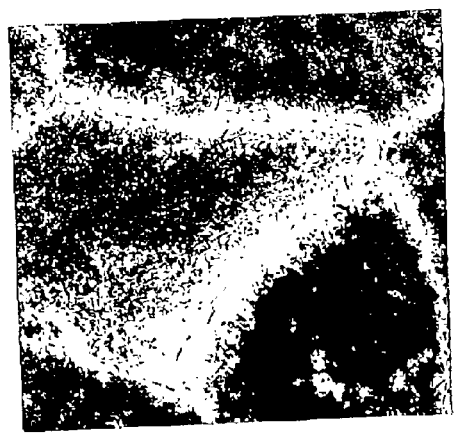
b) Cu-4.5Ni-1.5Si
c) Cu-6Ni-2Si
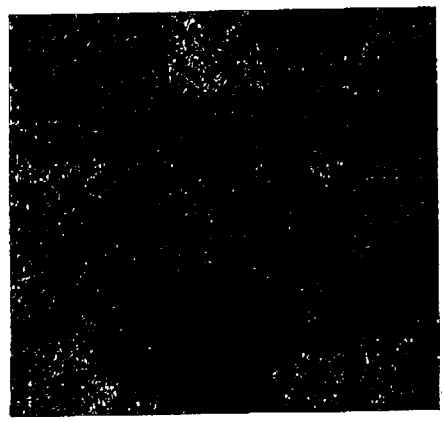
d) Cu-10Ni-3.33Si THE STRUCTURE OF A Cu-3Ni-1Si-0.5SiO$_2$ BASED
SINTERED COMPACT
(A MAGNIFICATION OF ×100)
(1100°C × 1HR)

0.1mm

THE STRUCTURE OF A Cu-10Sn-10Ni-0.55FeP-3Pb (B16)
BASED SINTERED COMPACT
(850°C × 1HR)

25 μm

COPPER BASED SINTERED CONTACT MATERIAL AND DOUBLE-LAYERED SINTERED CONTACT MEMBER

TECHNICAL FIELD

The present invention relates to a copper based sintered contact material and a double-layered sintered contact member produced by sinter-bonding the copper based sintered contact material to an iron based material.

BACKGROUND OF THE INVENTION

Generally, various copper based alloys are selected for use as a bearing material according to conditions such as oil lubricating conditions, sliding speed and sliding contact surface pressure. For bearing materials used in oil, comparatively soft bronze (e.g., BC3 and BC6), phosphor bronze (e.g., PBC2A), lead bronze (e.g., LBC 2–5) and kelmet (e.g., KJ 1–4) casting materials are utilized. In conditions a little poor in oil lubricity, Cu—Sn or Cu—Sn—Pb is used as a copper based sintered bearing material and bronzed based oil-less bearings produced by adding graphite (solid lubricant) to Cu—Sn or Cu—Sn—Pb (copper based sintered bearing material) are often used.

In the roller sections of undercarriages for construction machines, double-layered bearings are utilized which are produced by scattering a lead bronze based sintered material powder onto a metal backing, followed by sintering and rolling with a mill and by sinter bonding the sintered material to the metal backing by resintering. Such double-layered bearings to which a soft metal such as Sn is overlaid are widely used as an engine metal. Under sliding conditions with higher surface pressure, slower sliding speed and a likelihood of boundary lubrication, soft high strength brass (e.g., HBsC 1–4) having good seizure resistance and wear resistance is utilized (see "Engineering Data Book for Copper based Alloy Casting" (pp 134–155), edited by Japan Non-ferrous Metal Casting Association, issued by Materials Process Technology Center (SOKEIZAI CENTER), Jul. 30, 1988).

The recent demand for the most generally used bronze based and lead bronze based contact materials is to achieve improved seizure resistance and wear resistance under high sliding speed conditions while ensuring excellent wear resistance under slow sliding speed and poor lubricating conditions. In view of the current environmental problems, it is desirable to exert, without use of Pb, the characteristics of lead bronze sintered contact materials, namely, good comformability and constant seizure resistance.

It is conceivable that the frequent occurrence of galling accompanied by abnormal abrasion under high speed and high surface pressure sliding conditions is attributable to occurrence of agglutination/adhesion and its rapid growth caused by a contact between the metals in boundary lubrication. In many cases, great effort is made to restrain the galling by forming an overlaid layer from a soft metal (e.g., Sn) like the case of engine metals, thereby achieving improved comformability and fluid lubricity. However, this technique has revealed a problem in the durability and service life of the overlaid layer when the lead bronze based sintered contact material is used under higher surface pressure or in a condition where boundary lubricity increases because of additional conditions (e.g., vibration load and acceleration/deceleration) imposed on the material while the material being subjected to sliding contact. Therefore, it has become necessary to improve the sliding performance and durability of the lead bronze based sintered contact material itself.

On the other hand, lead bronze based and lead copper based sintered contact materials which contain large amounts of Pb suffer from the following problem: If they are used in a condition where, among others, sliding speed is high, or where acceleration and deceleration are repeated with changes in the rotating (sliding) direction so that sliding speed greatly changes, or where the mating material has high surface roughness, wear resistance will rapidly increase and as a result, sufficient durability cannot be ensured for long use.

The aforesaid high strength brass should be utilized if importance is given to the improvement of the wear resistance of a contact material, but it is normally hard, having a hardness of Hv 180 or more and therefore presents the drawbacks of poor comformability and a limitation to use under high load, low speed conditions. In addition, high strength brass has significantly high vapor pressure and a high concentration of highly oxidable Zn so that it cannot be bonded to steel by casting. Therefore, high strength brass cannot be utilized in casting-bonding to cylinder blocks, valve plates and the like which are made from iron based material to be used for hydraulic pumps and hydraulic motors, such casting-bonding being one of the chief objects of the invention to be described later.

Regarding wear resistance and seizure resistance, oil-impregnated copper based sintered contact materials have more or less the same problem. Brass based sintered contact materials are also extremely difficult to be sinter bonded to, for instance, iron based materials because of the high Zn concentration of the brass based material, and therefore they cannot be utilized in sinter bonding to cylinder blocks and valve plates.

In recent years, there are strong demands, in view of the environmental problems, towards a ban on use of Pb which is generally contained in lead bronze copper based contact materials.

A prior art bronze based sintered contact material, which has been improved in its characteristics from the above point of view, is disclosed in Japanese Patent Kokai Publication Gazette No. 11-350008 (1999). This publication proposes a double-layered bronze based sintered contact member and its bronze based sintered contact material. In this technique, a powder prepared by blending a bronze powder containing no Pb and 3 to 13 wt % of W powder is dispersed onto a metal backing made of a steel plate; the blended powder and the metal backing undergo sintering and rolling to have high density; and then, sintering is carried out again. According to this technique, since W has good affinity with respect to a bronze matrix and high bonding strength, dropping-off of W due to sliding resistance etc. does not occur. In addition, since W has proper hardness (W: Hv 350 to 500, Mo: Hv 200 to 250), namely, being harder than a bronze matrix and softer than ceramics particles which are too high in hardness and likely to give damage to their mating material, part of the W particles locally protrudes towards the mating contact member, forming an irregular contact surface. The level difference between the convex and concave portions of the irregular contact surface forms a lubricating oil film. Further, since W has a high melting point (3,410° C.), it does not melt unlike Pb. It is considered that, with these features, W keeps good sliding properties free from seizure and non-uniform sliding and does not wear the mating material.

The technique disclosed in the above publication has, however, an economical problem because the W particles to be dispersed for forming a lubricating oil film need to be contained in a large amount (3 to 13 wt %). In addition, as the sliding conditions become harder with increasing circumferential speed and increasing surface pressure, the W particles come into local metallic contact with the mating member, forming agglutinates even though the W particles do not melt unlike Pb. The W particles are not hard enough and therefore a satisfactory function for scratching off the local agglutinates cannot be achieved for stopping the growth of the agglutinates. As a result, a satisfactory improvement in wear resistance cannot be expected and moreover, the generation of a large amount of powder agglutinates leads to a failure in achieving a satisfactory improvement in seizure resistance.

Another technique is disclosed in Japanese Patent Kokai Publication Gazette No. 7-166278 (1995) in which 0.5 to 5 wt % Mo or 0.5 to 15 wt % Fe—Mo is added to a bronze based sintered contact material and/or a lead bronze based sintered contact material, whereby excellent lubrication as well as good affinity with respect to oil are imparted to attain a low friction coefficient and high wear resistance. This technique has proved unsuccessful in that, like Japanese Patent Kokai Publication No. 11-350008, the hardness of the Mo particles is not hard enough, entailing an unsatisfactory improvement in wear resistance and the generation of a large amount of agglutinated powder leads to an unsatisfactory improvement in seizure resistance.

In the producing method described in Japanese Patent Kokai Publication No. 7-166278, bronze based and/or lead bronze based sintered contact materials are compacted to form a green compact which is in turn fit to an iron metal backing plated with copper, and thereafter, a pressure of 10 $kg/cm^2$ or less is applied to carry out pressure sintering and sinter bonding, thereby providing a double layered sintered member having improved mechanical strength in the sintered compact. This producing method involves pressure sinter bonding and therefore imposes many geometric restrictions on its applications as well restrictions on equipment to be employed, which results in not only poor productivity but also high production cost. Additionally, in cases where Pb which is the most effective material for ensuring good comformability is added in a large amount, Pb is likely to flow out of a sintered compact when sintered in a pressurized condition because Pb is a metal element having a low melting point. A large amount of Sn or the like also flows out together with Pb so that not only large amounts of Sn and Pb cannot be contained in the above sintered contact material but also the flow-out of Sn and Pb through the production process causes an environmental problem.

Another well-known method is such that with a view to improving comformability and seizure resistance under severe lubricating conditions with high surface pressure and low sliding speed, a layered solid lubricant such as molybdenum disulfide ($MoS_2$), tungsten disulfide ($WS_2$) or graphite is added to a copper based sintered contact material. This technique has however revealed the problem that since molybdenum disulfide and tungsten disulfide tend to be decomposed into hard copper sulfide ($Cu_2S$) during sintering, it becomes necessary to add these disulfides in large amounts in order to ensure sufficient lubrication. This results in brittleness in the sintered compact and an increase in the cost.

Graphite does not react to a bronze based or lead bronze based sintered material, markedly restrains the sinterability of the sintered compact, weakens the strength of the sintered material, and is hardly wet by Sn rich and Pb rich liquid phases which are generated during sintering. Therefore, addition of graphite presents the problem that sweating becomes significant during sintering, producing a number of melt-off pores. In addition, boundary lubrication is promoted by the facts that as the amount of residual graphite increases, it becomes more difficult to compact the sintered layer and that graphite is a porous substance. In consequence, sliding properties under high-speed oil lubricated conditions cannot be improved as much as expected.

In the field of porous bronze based sintered materials which are used as a friction material for brakes and clutches in applications having utterly different purposes from those of contact materials for bearings, there have been developed materials capable to exhibit a high friction coefficient property for stopping a high speed rotor in a dry, semi-dry or boundary lubricating condition. These materials contain, as shown in Tables 1 to 3 (quoted from the report written by Hanazawa in "Journal of the Japan Society for Composite Materials" 3(1), 8, 1977; "Industries and Products" No. 59; and "Ceramics Data Book 76" p. 336, 1976), large amounts (5 to 15 wt %) of graphite as a base thereby to ensure porosity and low Young's modulus, and further contain heat-resistant metals (e.g., graphite and Mo) which are solid lubricants having excellent heat resistance to prevent the fusion and seizure of the mating material at the time of braking. Further, they contain 3 to 20 wt % hard particles (non-metallic particles) such as $SiO_2$ and mullite thereby restricting the plastic flow of the friction material metal base and properly scraping off the surface of the mating material to achieve an improvement in the wear resistance of the friction material and a stable high friction coefficient.

TABLE 1

The compositions of typical metalic cermet friction materials (wt %)

| | ingredients | | | | | | | | |
|---|---|---|---|---|---|---|---|---|---|
| | metalic ingredients | | | wear-resistant ingredients | | | | lubricating ingredients | |
| categories | Cu | Sn | Zn | silica | mulite | iron | Mo | graphite | Pb |
| metalic-1 | 67.3 | 5.3 | | 4.4 | | 7.1 | | 7.1 | 8.8 |
| metalic-2 | 60~75 | 5~10 | | 2~7 | | 5~7 | | 5~10 | 5~10 |
| metalic-3 | 62 | 7 | | 4 | | 8 | | 7 | 12 |
| cermet-1 | 60 | | | 5 | 20 | | 5 | 10 | |
| cermet-2 | 50 | | | 5 | 20 | 10 | 5 | 10 | |
| cermet-3 | 47 | 3 | 5 | 4 | 20 | 8 | 5 | 8 | |

TABLE 2

The typical compositions of cermet brake linings for aircraft (wt %)

| | ingredients | | | | | | | |
|---|---|---|---|---|---|---|---|---|
| | metalic ingredients | | | wear-resistant ingredients | | | | lubricating ingredients | |
| categories | Cu | Sn | Zn | silica | mulite | iron | Mo | graphite | Pb |
| example 1 | Bal. | 3~10 | 3~10 | 20~30 | | | | 5~10 | |
| example 2 | 60 | | | 5 | 20 | | 5 | 10 | |
| example 3 | 50 | | | 5 | 20 | 10 | 5 | 10 | |

TABLE 3

The typical compositions of cermet friction materials for general purpose (wt %)

| | ingredients | | | | | | | | | |
|---|---|---|---|---|---|---|---|---|---|---|
| | metalic ingredients | | | wear-resistant ingredients | | | | lubricating ingredients | | |
| categories | Cu | Sn | Zn | silica | mulite | iron | Mo | graphite | Pb | Bi |
| example 4 | Bal. | 5~10 | | 3~6 | | 3~6 | | 5~10 | 5~10 | |
| example 5 | Bal. | 3~6 | | 3~6 | | | | 4~6 | | |
| example 6 | Bal. | 5~10 | | 3~5 | | 3~5 | | 10~15 | 10~15 | |
| example 7 | Bal. | 3~6 | | 3~6 | | 3~5 | | 5~10 | | 5~10 |

If these friction materials are used as a sliding material such as disclosed in the present invention, there arise the following problems.

(1) The exothermic reaction caused at the contact surface by a high friction coefficient becomes a problem.

(2) Since the non-metallic powders are high in hardness, they cause excessive wear of their mating material.

(3) Since a large amount of the non-metallic material is unlikely to be bonded to the metal base, the strength of the sintered compact decreases and the wear resistance of the friction material itself is insufficient. Further, the non-metallic material is likely to drop off the friction surface so that the dropped powder sometimes galls other parts than the friction area.

(4) The friction materials and their mating materials are designed on assumption that they are periodically replaced as consumables.

The suitability of hard dispersion particles as a bronze based sintered friction material is described for example in Published Japanese Translations of PCT international Publication for Patent Applications No. 7-508799 (1995). In this publication, it is disclosed that a material having a friction coefficient as high as possible and independent of temperature, sliding speed, contact pressure and others can be obtained by adding hard particles in an amount of 5 to 40 wt %, the particles having a size of 50 to 300 μm and hardness of HV 600 or more and containing, for instance, carbides of Cr, Mo, W and/or V, nitrides of Al and/or Mo, and/or oxides of Cr, Ni and/or Zr. However, it is apparent that the friction coefficient of this material is so high that it cannot be utilized as a bronze base contact material and this material also suffers from the same problem as described earlier.

Regarding double layered sintered contact members such as engine metals formed by sinter bonding the above lead bronze based sintered contact material to a steel plate, since their production method involves sinter bonding carried out in a condition where an alloy powder having a composition of a lead bronze based sintered contact material is dispersed on a steel plate, the dispersed alloy powder is shrunk during sintering when sinter bonding is performed at a temperature which is at least equal to or higher than the peritectic temperature (about 800° C.) of Cu—Sn, so that the alloy powder is likely to come off during sinter bonding. When sinter bonding a bronze based alloy powder containing no Pb, the sintering temperature needs to exceed the peritectic temperature in order to produce a liquid phase essential for sinter bonding. The dispersed alloy powder shrinks more significantly than the lead bronze based material during sintering and therefore the alloy powder cannot be sinter bonded to the steel plate.

The present invention is directed to overcoming the above-described shortcomings. Therefore, a primary object of the invention is to improve the seizure resistance and wear resistance of a copper based sintered contact material while alleviating attacks on its mating material through scratching-off of local agglutinates on the sliding contact surface, by adding a proper amount of a hard dispersion phase having good agglutination resistance with respect to iron to the copper based sintered contact material, or to provide an inexpensive copper based sintered contact material having an improved critical seizure point by further adding a soft dispersion phase having good agglutination resistance and good lubricity to the copper based sintered contact material to restrain frictional heating caused by the hard phase.

A secondary object of the invention is to provide an inexpensive double-layered sintered contact member which is produced by dispersing a powder of a bronze based or lead bronze based sintered material onto a steel plate and then sinter bonding the dispersed powder to the steel plate, and to which stable sinter-bondability is imparted by adding elements for restraining the sinter shrinkage of the dispersion layer and/or elements for expanding the dispersion layer.

DISCLOSURE OF THE INVENTION

The above objects can be accomplished by a copper based sintered contact material which exerts good sliding contact properties not only in a high speed, high surface pressure condition but also in a low speed, high surface pressure condition. In view of this, the inventors have developed a copper based sintered contact material having the following features:

(1) By properly selecting non-metallic hard dispersion particles such as ceramics and intermetallic compound particles (hard, first dispersion particles) which have good agglutination resistance with respect to iron (mating material) and good thermal shock resistance and properly determining the amount of the above materials and the size of the dispersed phase, an action for scratching off agglutinates locally existing on the sliding contact surface is caused so that improved seizure resistance and wear resistance are obtained while reducing attacks on the mating material.

(2) To cope with severer sliding conditions, a soft dispersion phase (second dispersion particles) having good agglutination resistance and good lubricity is added to a copper based sintered contact material, whereby frictional heating caused by the hard phase is restrained and the critical seizure point (sliding property) is improved.

According to the invention, non-metallic hard dispersion particles (e.g., ceramics) and intermetallic compound particles which have good agglutination resistance with respect to iron and good thermal shock resistance are finely dispersed in a copper based sintered contact material to reduce attacks on its mating material as much as possible so that improved seizure resistance is achieved while the amount of Pb to be added is reduced or Pb is disused.

In addition, metal particles and/or alloy particles such as Mo, W, Cr. Fe and Co which cause remarkable phase separation relative to Cu are dispersed to reduce the crystal particle diameter of the copper based sintered contact material, and Pb and intermetallic compounds are finely dispersed to achieve improved seizure resistance. Further, the hard, first dispersion particles are dispersed to achieve improved wear resistance and seizure resistance. Among others, bronze based and lead bronze based sintered contact materials, in which the hard, first dispersion particles (i.e., the non-metallic particles and intermetallic compound particles) are dispersed in small amounts and particles of Mo, W and the like are dispersed, have proved to be excellent in seizure resistance and wear resistance when sinter bonded to the bottom surface of a cylinder block for hydraulic pumps and motors, the cylinder block sliding in a centrifugal whirling (described later) manner in a high speed, high surface pressure condition. It has been found that Fe—C alloy particles having a carbon content of 0.15 wt % or more produce a hard martensitic structure when they are cooled after sintering or subjected to other heating treatments so that improved wear resistance can be easily attained.

In the present invention, emphasis is placed on achievement of the sinterability of a copper based sintered contact material like the case of the cylinder block and on use of a copper based sintered contact material sinter-bonded to an iron based material. It has turned out that the bondability of a copper based sintered contact material relative to an iron based material can be significantly increased by adding 1 to 16 wt % Sn thereby to make a liquid phase having good wettability with respect to an iron based material appear and by adding alloy elements such as Si, Al, Ti, Cr and P.

It has also been found that where Sn is added in an amount of more than 12 wt %, the liquid phase normally existing in sintering at a temperature of 800° C. or more is changed to a Cu—Sn intermetallic compound (δ phase) precipitating in the grain boundary in the course of cooling and solidification and a β phase also finely precipitates in the matrix so that extendibility is restrained and agglutination is significantly alleviated. This is particularly important for the condition in which a sliding contact occurs in a centrifugal whirling manner (described later) like the case of cylinder blocks for hydraulic pumps and motors. This is also useful for contact materials in which the aforesaid intermetallic compound phase is dispersedly precipitated in large amounts and for contact materials to which hard particles such as oxides, carbides and nitrides are added in small amounts.

In the case of a double-layered sintered contact member in which a mixed powder of a bronze based sintered material powder and a lead bronze based sintered material powder is applied to a steel plate for sinter bonding, the dispersing alloy powder is more significantly shrunk than lead bronze based materials, causing a sinter bonding defect relative to the metal backing. It has been found that stable sinter bondability can be ensured by adding an element which restrains the sinter shrinkage of the dispersion layer in order to prevent such a defect.

Specifically, according to a first aspect of the invention, there is provided a copper based sintered contact material in which non-metallic particles, comprised of one or more substances selected from the group consisting of pulverized oxides, carbides, nitrides and carbonitrides, are dispersed in an amount ranging from 0.2% by volume or more to less than 4% by volume.

Preferably, the non-metallic particles are thermal-shock-resistant, oxide-based ceramics comprising $SiO_2$ and/or one or two or more elements selected from the group consisting of Si, Al, Li, Ti, Mg and Zr (a second aspect of the invention). The non-metallic particles may have an average particle diameter of 70 μm or less and more preferably are in the form of granules and/or fibers having a size of 45 μm or less (a fourth aspect of the invention).

According to the invention, where carbides, nitrides and carbonitrides are utilized as the non-metallic particles, WC, TiC, TiN, TiCN, $MO_2C$, $Si_3N_4$ and the like, which are often contained in materials for cutting tools, are preferably used as the non-metallic particles and the average particle diameter of them is adjusted to 5 μm or less. If the segregation of the particles becomes a problem when blending them, it is preferable to use cemented carbide particles mainly containing Co—Wc having an average particle diameter of 70 μm or less, cermet particles mainly containing Ni—TiCN, and a high speed tool steel powder in which carbide such as $MO_2C$ and WC precipitates (a third aspect of the invention).

According to a fifth aspect of the invention, there is provided a copper based sintered contact material in which one or more kinds of intermetallic compounds each comprising two or more elements selected from the group consisting of Ni, Si, Ti, Co, Al, V and P are dispersed and the total amount of the two or more elements selected from Ni, Si, Ti, Co, Al, V and P is within the range of from 0.5 to 10 wt %.

According to a sixth aspect of the invention, there is provided a copper based sintered contact material in which one or more kinds of intermetallic compounds each comprising two or more elements selected from the group consisting of Cu, Sn, Ca, Mn, Cr, Mo, W, Sb and Te are dispersed and the amount of the one or more intermetallic compounds is within the range of from 0.1 to 10% by volume.

Preferably, the intermetallic compounds of the fifth aspect and the six aspect coexist (a seventh aspect of the invention).

Preferably, non-metallic particles comprising one or more substances selected from the group consisting of the oxides, carbides, nitrides, carbonitrides and borides are contained in an amount which ranges from 0.1% by volume or more to less than 4% by volume and the total amount of the dispersion phase of the non-metallic particles is 0.1 to 10% by volume (an eighth aspect of the invention).

According to each of the above aspects, metal and/or alloy particles comprising Mo, W, Cr, Co, Fe and Fe—C are preferably dispersed in an amount of 0.5 to 5.0 wt % (a ninth aspect of the invention). Further, it is preferable that 1 wt % or less MnS and/or 1 wt % or less graphite be contained (a tenth aspect of the invention). In this case, the average particle diameter of MnS and/or graphite may be 20 to no more than 200 $\mu$m (an eleventh aspect of the invention).

Preferably, in each of the above aspects, at least 1 to 16 wt % Sn is contained and 0 to 25 wt % Pb is contained (a twelfth aspect of the invention). It is also preferable that 12 to 16 wt % Sn be added and a Cu—Sn compound phase be dispersedly precipitated in the structure of the sintered contact material (a thirteenth aspect of the invention). In this case, it is preferable that one or more alloy elements selected from the group consisting of Zn, Mn, Be, Mg, Ag and Bi and a solid lubricant such as $MoS_2$, $CaF_2$ and $WS_2$ be contained (a fourteenth aspect of the invention).

(1) Selection of Ingredients for the Hard, First Dispersion Particles

It is disclosed in Published Japanese Translations of PCT international Publication for Patent Applications No. 7-508799 that a certain material having the highest possible friction coefficient and independent of temperature, sliding speed and contact pressure can be obtained by adding 5 to 40 wt % suitable hard dispersion particles selected from, for instance, the carbides of Cr, Mo, W and V; the nitrides of Al and Mo; and the oxides of Cr, Ni and Zr, such particles having a size of 50 to 300 $\mu$m and hardness of HV 600 or more. If the selection range for the hard particles includes $SiO_2$, $Al_2O_3$ and mullite, it can be amplified as a wide range of compound phases. On the other hand, the invention aims to provide a contact material having the lowest possible friction coefficient over a wide range of sliding speeds and contact pressures and exhibiting excellent wear resistance and seizure resistance for the purpose of restricting attacks on its mating material (iron based material) as much as possible. From this point of view, the inventors have developed a copper based contact material in which wear resistance is attained by the pulling-off action of the hard, first dispersion particles whereas excellent comformability, seizure resistance and wear resistance are assured in both low speed and high speed conditions by selecting suitable ingredients and properly determining their amounts and sizes.

(1-1) Oxides, Carbides, Nitrides and Carbonitrides (Hard Non-metallic Particles)

As described earlier, it is generally conceivable that the pulling-off action of the hard, first dispersion particles (non-metallic particles) becomes more significant with more improved wear resistance, as the hardness and size of the non-metallic particles increase. However, seizure resistance and wear resistance cannot be simply improved by increasing the hardness of the first non-metallic particles. For example, when hard particles of $ZrB_2$, $Al_2O_3$ and $SiO_2$ were respectively added in an amount of 0.3 wt % (this experiment will be described later), it was found that $ZrB_2$ (Hv=3000) exhibited the worst seizure resistance, with $Al_2O_3$ (HV=2000), $SiO_2$ (Hv=780) in that order.

It has also been found from the comparison data on $Al_2O_3$ and $SiO_2$ having different sizes that as the size of $Al_2O_3$ increases, wear resistance remarkably increases while seizure resistance decreasing and that the size of $SiO_2$ does not considerably affect these properties. Particularly, in the case of $Al_2O_3$ hard particles having higher hardness than its mating material (the surface hardness of a carburized quenched steel=Hv 900), as the particle diameter of $Al_2O_3$ increases, attacks on the mating material becomes more significant. In the case of hard non-metallic particles (e.g., $Al_2O_3$ and TiN) having Hv 1,000 or more, it is desirable to disperse fine particles having an average particle diameter of 5 $\mu$m, because attacks on the mating material can be alleviated.

Regarding hard particle size, significant attacks such as caused by $Al_2O_3$ were not observed in the case of $SiO_2$ and $ZrO_2$ having an average particle diameter of about 20 $\mu$m. Provably, this result is attributable to the facts that these particle materials are not as hard as $Al_2O_3$ and, particularly, $SiO_2$ makes a gentle pulling-off action because its Young modulus is lower than those of Cu alloys (serving as a base material) and steel (serving as a mating material) and that $SiO_2$ has high strength relative to a thermal shock stress which is likely to occur while $SiO_2$ making a pulling-off action on the sliding contact surface as described later.

In the constant rate friction abrasion test which was conducted on an $Al_2O_3$ ceramics sintered compact under a lubricating condition prior to the tests conducted on Examples of the invention (described later), the $Al_2O_3$ ceramics sintered compacts presented an extremely low seizure limit value (PV value) in a high speed sliding condition. The reason for this is that destructive wear particles were produced by a thermal shock stress imposed on the $Al_2O_3$ sliding contact surface. This is apparent from the report written by Tsukamoto, Takahashi, Komai, Hayama et. al. in "Powder and Powder Metallurgy" 31, p290 (1984) in which they reported that $Al_2O_3$ in a friction material was destroyed by a thermal shock stress.

With the above facts, the inventors have clarified that since the hard, first non-metallic particle material needs to be involved in the pulling-off action at the sliding contact surface as described earlier, it must meet the following requirements as a hard dispersion particle material for the copper based sintered contact material: (1) the particle material must posses an adequate hardness of Hv 350 or more; (2) the particle material must provide excellent agglutination resistance relative to iron (mating material); and (3) the particle material must have excellent thermal shock resistance, when taking account of the fact that the non-metallic particles are subjected to a severe thermal shock caused by rapid heating and rapid cooling when the pulling-off action takes place on the sliding contact surface.

To attain excellent thermal shock resistance, the non-metallic particles should have at least one of the following properties which are: (1) extremely low thermal expansion coefficient; (2) high heat conductivity; (3) low Young modulus; and (4) plastic deformability.

$SiO_2$ proposed by the invention has a considerably small thermal expansion coefficient and low Yong's modulus equal to or lower than that of copper as described earlier. Further, it has nearly the same hardness as that of quenched steel as described earlier and makes less attacks on the steel material. Taking these characteristics into account, it is apparent that $SiO_2$ is the optimum material. As a thermal-shock-resistant material similar to $SiO_2$, cordierite, spodumen, eucryptite, $Al_2O_3$, $TiO_2$ or the like is apparently suitably used.

It is also obvious that even if the material of the non-metallic particles is brittle under a thermal shock stress like $Al_2O_3$ mentioned above, brittleness can be overcome by fining the particles to be dispersed so as to have a grain size of 5 μm or less.

Hard dispersion particles of carbides, nitrides and carbonitrides generally have excellent heat conductivity and therefore excellent thermal shock resistance. Further, the carbides, nitrides and carbonitrides of WC, TiC, TiCN, $Si_3N_4$, TaC, HfC, ZrC, $Mo_2C$, VC are useful, as apparent from the following example of TiN addition (described later) and from the fact that they are used in the production of cutting tools made from iron based materials. Since the hard dispersion particles of these materials are extremely fine, having an average particle diameter of 2 μm or less because of their producing method, there sometimes arises a problem in their uniform dispersibility when dispersed in a copper based sintered contact material. Therefore, the invention utilizes, as the hard, non-metallic particles, cermet particles comprised of these carbides, nitrides, carbonitrides, Co and Ni, because such cermet particles are excellent in terms of thermal shock resistance. The average size of the cermet particles to be added is not particularly specified but preferably adjusted to 70 μm or less if required in the post treatment.

As described earlier, where the non-metallic particles are too hard (e.g., Hv=1,000 or more), the dispersion particles are fined to 5 μm or less in order to alleviate the mating material-attack property. In the case of $SiO_2$ (HV=780) and $ZrO_2$ (Hv=1,050) having an average particle size of 20 μm, a significant attack property as is in $Al_2O_3$ was not observed and it is therefore conceivable that no serious problem is caused even when a proper average grain size for the dispersion particles having a hardness of Hv 1,000 or less is determined to be about 70 μm (equal to the grain size of powder for general metallurgical use). However, taking account of the fact that the attack property becomes more insignificant as the dispersion particles become finer, the grain size of the dispersion particles is preferably 45 μm or less for ensuring more safety and more preferably 10 μm or less in view of their dispersibility into the crystal grains of the sintered material (described later).

Since addition of non-metallic particles generally spoils the sinterability of a copper based sintered contact material and pulverized non-metallic particles having a size of 1 μm or less causes significant aggregation between particles, it is difficult to uniformly mix non-metallic particles with powder for general metallurgical use. Therefore, there is a risk that the non-metallic particles disperse in a linked fashion within the grain boundary of the resulting sintered compact; the sintered compact has aggregation and brittleness; and bondability cannot be ensured when the mixed powder for sintered contact material is sinter bonded to the metal backing after dispersion of it onto the metal backing as described later. It is obvious from the above fact that $SiO_2$, $ZrO_2$ $SiO_2$, cordierite, spodumen, eucryptite, $Al_2O_3$ $TiO_2$ and the above-described cermet particles, which do not require fining, are most suitably used as the non-metallic particles. Addition of fiber-like or needle-like non-metallic particles in place of a fine non-metallic powder is desirable in view of prevention of segregation/separation at the time of the blending and dispersion described above. $Al_2O_3$ $TiO_2$, which has particularly good availability, may be used in the form of fibers.

The amount of the non-metallic particles to be added to the contact material may be 4% by volume and more preferably 2% by volume, for the following reasons. The maximum effect of improving wear resistance is achieved with 1.0 wt % $SiO_2$ and $Al_2O_3$ particles and where the densities of $SiO_2$ and $Al_2O_3$ are 2.2 g/cm³ and 3.9 g/cm³ respectively, the area percentages (volume percentages) of $SiO_2$ and $Al_2O_3$ at the sliding contact surface are about 4.0% and 2.2% respectively. Therefore, the effect of the dispersion of the hard particles upon the improvement of the wear resistance of the contact material becomes adequate when the area percentage (volume percentage) of the non-metallic particles is substantially 4% by area. If the non-metallic particles are added more, a friction coefficient meaninglessly increases with the mating material attack property becoming more significant. The proper lower limit for the amount of the non-metallic particles is 0.2% by volume with which the wear resistance improving effect starts to emerge more distinctly.

When a test was made for investigating the relationship between the hardness of the matrix (Hv=40 to 160) and the proper amount of the non-metallic particles in various contact materials, it was found that as the hardness of the matrix increases, the above effect could be achieved with a less amount of e.g., $Al_2O_3$ and that the amount of $Al_2O_3$ in this case ranged from 0.05 to 0.5 wt %. For example, in the case of Cu—25 wt % Pb (lead copper sintered contact material) which is an extremely soft material, the amount of $SiO_2$ to be added is conceivably up to about 2.0 wt %. The area percentage of $SiO_2$ at the sliding contact surface is about 8% by area. The conceivable reason for the increase of the proper amount of the hard particles is that the power of the hard particles for scratching off the agglutinates of the mating material decreases in proportion to the hardness of the matrix. When taking account of the wear resistance improving effect of the soft matrix contact material Cu—25 wt % Pb in conjunction with the mating material attack property, the proper amount of the hard non-metallic particles is within the range of from 0.05 to 1.0 wt %. On the other hand, when giving importance to the mating material attack property, it is desirable to restrict the amount of the non-metallic particles to 0.5 wt % or less. In addition, in the case of bronze based and/or lead bronze based sintered contact materials containing Pb in an amount of less than 10 wt %, the amount of the non-metallic particles is preferably 0.5 wt % or less.

For the structure of the contact material after sintering, it is undesirable to let the non-metallic particles string out in the grain boundary but desirable to disperse most of the non-metallic particles into the crystal grains of the copper based sintered contact material. In the invention, the amount of the non-metallic hard particles required for the invention is very small, say, less than 4% by volume and more preferably about 2% by volume (0.5 wt % in the case of $SiO_2$). Where the non-metallic particles have an average particle diameter of 10 μm or less and sintering is carried out on condition that the resulting copper based sintered contact material is sufficiently compacted, most of the non-metallic particles are entrapped in the grains because of the growth of the grains during sintering, so that brittleness is further mitigated.

In order not to impair the comformability of the sintered contact material, it is preferable that the hardness of a sintered contact material containing the non-metallic particles is the substantially the same as that of a sintered contact material containing no non-metallic particles (the changes in hardness caused by addition of the non-metallic particles is 10% or less). In the invention, the increase in hardness caused by addition of 0.05 to 0.5 wt % the non-metallic hard particles is substantially negligible so that the comformability of the sintered contact material is not spoiled.

As described later, it has been found from an investigation conducted on Mo and W that dispersion of Mo, W has little effect of improving, particularly, wear resistance and that the non-metallic hard particles are the most suitable material for the hard particles dispersed in small amounts for improving the wear resistance of the copper based sintered contact material. In addition, it has been confirmed that remarkable wear resistance improving effect and seizure resistance improving effect can be achieved by addition of less than 2% by volume of the hard particles in combination with Mo and W.

(1-2) Intermetallic Compounds

Generally, intermetallic compounds are known to be much harder than metals but have properties (e.g., good thermal shock resistance and plastic deformability) more similar to metals than the aforesaid oxides, carbides, nitrides and carbonitrides. Tsukamoto, Takahashi, Komai, Hayama et. al. investigated cases where large amounts of various intermetallic compounds were added, with a view to attaining high friction coefficients and an improvement in the wear resistance of friction materials and reported in "Powder and Powder Metallurgy" 31, p. 290 (1984) that intermetallic compounds suited for friction materials had a hardness of Hv 350 or more and a softening temperature of 400° C. or more. However, as obvious from the cases of $ZrB_2$ and $Al_2O_3$ described above, the sliding properties cannot be simply improved by optimizing the hardness of the intermetallic compounds.

In the invention, with a view to achieving good sliding properties and/or wear resistance not only by optimizing the hardness of the intermetallic compounds but also by allowing the intermetallic compounds themselves to exhibit good seizure resistance, the intermetallic compounds, which comprise elements unlikely to develop local agglutination voluntarily even if the intermetallic compounds locally agglutinate to their mating iron based materials, are clarified based on a thermodynamic method. For obtaining such intermetallic compounds, elements which satisfy the following conditions are selected: (1) The thermodynamically excessive energy when Fe and the elements constituting the intermetallic compound are alloyed by agglutination at their contact faces has a great positive value; and (ii) Fe and the elements constituting the intermetallic compound chemically repel each other within the agglutinative alloy.

(1-2-1) Intermetallic Compounds Comprising Two or More Elements which Strongly Thermodynamically Repel Fe.

If the thermodynamically excessive energy when Fe and the elements constituting the intermetallic compound are alloyed by local agglutination at the sliding contact surfaces has a great positive value and the energy state after the alloying is more unstable than the state before the alloying (endothermic reaction), local agglutination does not progress by itself and the intermetallic compounds, that satisfy the above conditions, are apparently excellent in seizure resistance. Such intermetallic compounds that satisfy the above conditions need to comprise elements which strongly repel Fe.

An element "M" which strongly repels Fe is analyzed such that a thermodynamic interaction parameter $\Omega$ FeM associated with Fe and the element "M" contained in an Fe-M alloy has a great positive value. In the Fe-M binary phase diagram, the element "M" is represented by the phase separation in which Fe and "M" do not homogeneously mix with each other. More extremely, it is represented by a phase diagram in which "M" is not dissolved in a solid state within Fe because of the repelling force of their atoms. More concretely, the element "M" is specified as follows according to the Hansen phase diagram. (1) Examples of the element "M", which has proved to cause phase separation relative to Fe and thermodynamically satisfy $\Omega$ FeM>>0, include Be, Cr, Mo, W, Mn, Cu, Au, Zn, Sn, Sb, S and O. (2) Examples of the element, which hardly dissolves in a solid state, include Pb, Bi, Ag, Li, Na, K, Mg, Ca, Rb, Sr, Ba, Cd and Te.

Accordingly, in view of not only the sliding properties but also strength, it is preferable to produce a copper-alloy based sintered contact material by adding one or more Fe-repelling alloy elements to a contact material containing Cu as a chief component, Cu forming a distinct phase separation line in the Cu—Fe phase diagram. In view of the cost performance of a sintered contact material, it is preferable to dispersedly precipitate Cu—Sn based intermetallic compounds such as $\delta$, $\beta$ and $\gamma$ phases in a bronze based sintered material to which a large amount of Sn has been added in order to increase the strength and sinterability of Cu. From the same viewpoint, dispersion of $CaCu_3$, $Ca_2Sn$, $CrMn_3$, $Ca_3Sb_2$, $Ca_3Tl_4$ and the like is effective. Further addition of alloy elements such as Zn, Be, Cr and Mn with the intention of achieving high strength is desirable for a contact material.

Since Mo and W are elements which not only repel Fe but also strongly repel Cu and Sn which are the chief components of a bronze based material, they are dispersed as metal particles within a bronze based sintered contact material, functioning to improve the seizure resistance of the bronze based sintered contact material. However, Mo and W are not as hard as the aforesaid ceramics and intermetallic compounds (Mo=Hv 180; W=Hv 120 to 350; Cr=Hv 700 to 800), they do not provide improved wear resistance.

Cr also strongly repels Cu and Sn and is therefore dispersed in a bronze based sintered contact material as metal particles. In addition, Cr is harder than Mo and W. Therefore, it is expected that the scratching-off action of Cu is marvelous and highly improved wear resistance can be achieved by addition of a small amount of Cr. However, the repelling power of Cr is not as strong as Mo and W and accordingly, the seizure resistance improving effect of Cr is small.

With a view to ensure both wear resistance and seizure resistance, the main feature of the invention resides in utilization of the aforesaid hard particles and intermetallic compounds in combination with Cr, Mo and W particles. Since Cr, Mo and W particles do not have a significant mating material attack property, the proper amount of Cr, Mo and W particles is greater than the amount of the ceramics and intermetallic compounds, being less than 5 wt %. More preferably, the amount of Cr, Mo and W particles falls within the range of from 0.5 to 2.0 wt % on the ground that the effect of addition of these particles becomes satisfactory when the amount of these particles is 0.5 wt % and reaches its peak when their amount is around 2 wt % and that addition of a large amount of these particles leads to increased cost. One of the features of the invention is such that if Cr, Mo and W are added in a large amount, the crystal grains of a lead bronze based sintered contact material are significantly pulverized, while Pb and the Cu—Sn intermetallic compound being finely dispersed, so that markedly improved high-speed sliding properties can be achieved.

The action of pulverizing the crystal grains can be achieved by adding Co and Fe which are element strongly repelling the chief component of a bronze based material, Cu, and/or by dispersing an FeCo ordered phase or Fe—C alloy. The pulverization of the crystal grains is expected to provide an improvement in the high-speed sliding properties of bronze based and lead bronze based sintered contact materials.

For increasing the seizure resistance of Fe—C alloys with respect to their mating iron based material, it is preferable to utilize a martensitic structure which is quench-hardened through a cooling process subsequent to sintering or another thermal treatment.

(1-2-2) Emergence of Phase Separation Caused by a Combination of Two or More Metal Elements Satisfying Ω FeM<<0 and Intermetallic Compounds In the foregoing description, as the intermetallic compounds serving as a hard non-metallic dispersion phase, examples of the intermetallic compounds which comprise two or more elements repelling Fe have been explained. It has been also thermodynamically testified that, in the ternary Fe phase diagram, phase separation occurs in a combination of two or more metal elements which strongly attract Fe (Ω FeM<<0) and attract each other. Accordingly, the same effect of improving agglutination resistance and wear resistance as described earlier can be obtained by dispersing one or more intermetallic compounds containing two or more such elements in combination.

More concretely, most of the elements which attract Fe generally form an ordered phase according to their phase diagrams. Although there are some elements which do not form an ordered phase according to their phase diagrams, most of them have proved by measurements to satisfy Ω FeM<<0. Examples of such elements include Al, Si, P, Sb, Ti, V, Co, Ni, Fe, Zr, Nb, Pd, Hf, Ta and Pt. In cases where one or more intermetallic compounds comprising two or more elements which attract each other and are selected from the above group are dispersed in a copper based contact material, good agglutination resistance can be ensured similarly to the foregoing cases represented by Ω FeM>>0.

In the following embodiments, the relationship between the dispersion precipitation amount and sliding properties of an Ni—Si intermetallic compound ($Ni_3Si$) is clarified taking a high-strength Cu—Ni—Sn based sintered contact material for example. In this case, it has been confirmed that the precipitation of a fine intermetallic compound leads to improved agglutination resistance; the co-existence of the ceramics based dispersion particles, MnS and graphite leads to considerably improved wear resistance and agglutination resistance; the same effect as is in a dispersion of the phase separation type metal particles is observed; and a dispersion of $NiAl_3$ and $Ti_2P$ entails improved agglutination resistance and wear resistance. Intermetallic compounds similar to the above intermetallic compound are each comprised of two or more elements selected from the group consisting of Ti, V, Fe, Ni, Co, Al, Si and P. Among them, Si based intermetallic compounds are hard, having a hardness of more than Hv 1,000 in many cases and therefore it is preferable to disperse Si based intermetallic compounds having a particle diameter of 5 $\mu$m or less.

Although FeCo, $Fe_3Al$, FeAl, FeSi, $Fe_3Si$ are ordered phases of the BCC structure, they are all treated as intermetallic compounds.

Further, most of the aforesaid Al compounds, Ti compounds and/or P compounds (phosphide) do not have a Vickers hardness exceeding Hv 900. Therefore, their attack properties are not a problem in cases where a carburized and quenched steel is used as their mating material. If the mating material is worn out resulting from precipitation of hard $Ti_2P$ (described later), the amount of $Ti_2P$ should be reduced of course, but it is also desirable to add, in combination, the above-described lubricating substances such as MnS and graphite.

Representative examples of the intermetallic compounds are NiAl, $NiAl_3$, NiTi, $Ni_3Ti$, CoAl, $Co_3Al$, TiAl, $Ni_3S_1$, $V_5Al_6$, $Fe_3Al$, FeAl, $Ti_2P$ (combined addition of phosphor iron (Fe 27% P) and Ti), FeCo, FeV, $Fe_2Ti$, $Fe_2Zr$ and $Fe_2Nb$.

Some intermetallic compounds among them have a hardness exceeding Hv 900 like Si based intermetallic compounds. When using such intermetallic compounds, it is preferable to set the lower limit of their amount to 0.05 wt % similarly to the case of the ceramics based hard dispersion particles. The amounts of the elements which constitute an NiAl based intermetallic compound ($\gamma'$ phase, density=5.9 g/cm$^3$) in high strength brass of the fourth class (Japanese Industrial standards) and its equivalent materials are represented by:

4 wt % <Al+Si<6 wt %

3.5 wt % <Ni+Co+Fe<6.5 wt %.

As seen from the above formulas, the high strength brass and the like contains a composite intermetallic compound (Ni, Co, Fe)(Al, Si). Accordingly, the intermetallic compounds proposed by the invention may be composite intermetallic compounds in which other alloy elements are dissolved in a solid state.

Such intermetallic compound phases do not have a hardness exceeding Hv 900. In the case of a Cu—10 wt % Ni—3.33 wt % Si based sintered contact material, the size of $Ni_2Si$ precipitates in the particles is as small as 2 $\mu$m or less and the amount of $Ni_2Si$ precipitates is about 10% by volume. If the amount of $Ni_2Si$ precipitates exceeds 10% by volume, their effect declines and therefore, the proper precipitation amount is determined to be 10% by volume or less. It is more preferable to use 7 wt % Ni+2.33 wt % Si in an amount of 10 wt % or less, because it exhibits good sliding properties. Regarding the intermetallic compounds and composite intermetallic compounds of the invention, it is preferable to limit the amount of the intermetallic compounds to 10% by volume or less or to limit the sum of the main elements of the intermetallic compounds to 10 wt % or less (=about 7% by volume or less on the basis of percentage by volume). This is also effective for cost performance.

These intermetallic compounds may be added in the form of an intermetallic compound powder. Alternatively, primary powders may be added in combination to precipitate the intermetallic compounds like the case of Ni and Si addition.

According to the invention, it is more preferable to add the intermetallic compounds in the form of an intermetallic powder. Because, an intermetallic compound powder promotes formation of blow holes for gas escaping and prevents formation of melt-off pores, so that degradation of sinterability due to rapid choking of pores can be avoided.

The $Fe_3Al$ ordered phase containing 5 wt % or more Al has a Vickers hardness of 300 to 350. When adding alloy elements such as Ni and Co in an amount of 10 to 20 wt % to the above $Fe_3Al$ ordered phase, it can be hardened to a level of Hv 800 by aging treatment at about 600° C. Therefore, the $Fe_3Al$ ordered phase has a considerable degree of freedom as a dispersion phase and is also cost effective.

(2) Selection of Ingredients for the Soft, Second Particle Dispersion Material

While well-known solid lubricants such as $MoS_2$ and $WS_2$ may be regarded as a soft particle dispersion material, the principle of the mechanism for improving the sliding properties by the presence of the soft particle dispersion material resides in the following point: Solid lubrication at the sliding contact surface of the sintered contact material is enhanced, the sliding contact surface being in direct sliding contact with the mating material while the hard particles scratching off local agglutinates on the sliding contact surface, and as a result, attacks on the mating material are considerably reduced and seizure resistance is improved. The soft particle dispersion material is expected to have substantially the same effect as that of the lubricating components of the friction materials described earlier. In the invention, the amount of the soft particle dispersion material to be added is limited to a value much smaller than the normal amounts shown in TABLES 1, 2 and 3, that is, 1 wt % or less. The reason for this is that if a large amount of graphite is added, the resulting sintered layer becomes porous as described earlier, with a transition from fluid lubrication to boundary lubrication, resulting in a high friction coefficient. In view of the strength of a sintered contact material, it is highly desirable that the amount of the soft, second dispersion particles which cause a decrease in strength be markedly reduced by restricting the amount of the hard, first non-metallic particles to an extremely small value and by employing an adequate size for the first non-metallic particles.

As the above soft particle material rich in solid lubricity, various solid lubricating materials such as shown in "Solid Lubricant Hand Book" may be used. However, it is desirable to avoid use of soft particles such as $MoS_2$ and $WS_2$, because they react to Cu during the sintering process of the copper based sintered contact material so that $MoS_2$ or $WS_2$ is likely to be decomposed into soft copper sulfides. In addition, $MOS_2$ and $WS_2$ are very expensive. If they are used in the invention, the surfaces of $MOS_2$ and $WS_2$ particles are coated with a reaction inhibitor such as water glass, or alternatively, particles granulated with water glass etc. are added.

Graphite does not need water glass coating because it does not react to Cu and Sn during sintering. However, as graphite particles become finer, they are more likely to disperse in a linked fashion within a sintered contact material during sintering, leading to a significant decrease in strength of the sintered compact. In such a case, it is preferable to use crushed graphite particles having a size of 0.02 mm or more or graphite particles granulized with water glass. It has been confirmed that when graphite is added in a large amount like the case of the friction materials, oil film formation under high-speed sliding oil lubrication is inhibited, resulting in an increased friction coefficient because graphite is extremely porous. Therefore, addition of graphite more than necessary is undesirable for contact materials used in both low-speed and high-speed conditions like the invention.

When adding graphite in bronze based and/or lead bronze based sintered materials, it is preferable to add one or more elements selected from the group of Ti, Cr, Mg, V, Zr, Mn, Ni and Co in order to restrain the sweating phenomenon of Sn and Pb during sintering. These elements are highly capable of forming an intermetallic compound, reacting to Sn and Pb and are excellent in affinity with respect to Sn, Pb and/or carbon. Since the sweating phenomenon of Sn and Pb is significant particularly where Si and Al are contained in a sintered material, it is desirable to add one or more elements selected from the group of Ti, Cr, Mg, V, Zr, Mn, Ni and Co.

If the percentage by volume of MnS, which is added in place of Pb as a Pb-less material for imparting comformability and sliding properties similar to those of a lead bronze based sintered material containing 10 wt % Pb, is approximate to the percentage by volume of Pb, the amount of Mns may be estimated to be about 5 wt % (the density of Mns=5.2 $g/cm^3$ and the density of Pb=11.34 $g/cm^3$). However, a satisfactory improvement can be obtained by 1 wt % Mns, thanks to the effect of the dispersion of the non-metallic hard particles.

Where a large amount of MnS is added, MnS particles disperse in a linked fashion like graphite within the grain boundary of the sintered compact, considerably decreasing sinter strength. Therefore, the size of the MnS powder to be added is preferably equal to or more than the size level (0.02 mm or more) of ordinary metallurgical powders. For preventing the linked dispersion of particles such as MnS within the grain boundary, MnS is preferably alloyed beforehand at the time of production of bronze, lead bronze and/or copper powders. The scope of the invention covers addition of one or more alloy elements selected from Ti, Zn, Al, Ni, Mn and others for the purpose of preventing a sulfur attack in the bronze based sintered contact material and addition of alloy elements for the purpose of improving other copper alloy properties.

(3) Double-layered Sintered Contact Member

The invention provides a double-layered sintered contact member formed by sinter bonding the copper based sintered contact material to an iron based metal backing material. More specifically, according to a fifteenth aspect of the invention, there is provided a double-layered sintered contact member formed by sinter bonding any one of the above-described copper based sintered contact materials to an iron based material.

Preferably, the double-layered sintered contact member of the invention is formed by sinter-bonding a pressed compact formed from a sintered contact material containing Sn and/or Pb to an iron based material, the sintered compact sinter-bonded to the iron based material containing 0.1 to 2 wt % one or more elements selected from the group consisting Cr, Si, Al, P and Ti which have higher affinity with respect to iron than with respect to copper and stabilize the α phase of iron more than the γ phase of iron (a sixteenth aspect of the invention).

Preferably, the double-layered sintered contact member of the invention contains Si, Al, Ti and Cr which expand a sintered layer and/or one kind of non-metallic particles which restrains a shrinkage of a sintered layer, for fear that when using the double-layered sintered contact member which has been produced through a process in which a mixed powder having a sintered contact material composition and containing Sn and/or Pb is dispersed onto a steel plate, subjected to first sinter bonding at 810° C. or more, and then subjected to second sintering by mechanically increasing the density of the sintered dispersed powder layer, the layer of the mixed powder dispersed in the first sintering might peel off the steel plate owing to sinter shrinkage (a seventeenth aspect of the invention). In this case, Sn may be added by utilizing a Cu—Sn based alloy powder containing Sn in an amount no less than Cu—30 wt % Sn and/or an Sn primary powder so that the sintered layer in the first sintering is expanded (an eighteenth aspect of the invention).

A method for sinter-bonding a copper based green compact to steel is disclosed in Japanese Patent Kokai Publication No. 10-1704 (1998) filed by the present inventors. This technique teaches copper lead, bronze and lead bronze based sintered contact materials containing 0.2 to 3.0 wt % Ti, which ensure improved sinter-bondability with respect to steel and therefore improved sliding properties.

Copper based sintered materials suffer from the problem of violent tool abrasion when machined and therefore there have been strong demands to a new selection of elements which promotes sinter bondability to contribute to mitigation of tool abrasion.

The inventors have carefully studied the influence of various alloy elements when a green compact of a copper based sintered contact material is sinter bonded to steel, and selected alloy elements which satisfied the following conditions:

(1) Stable sinter bondability can be ensured even for sinter bonding of a large area such as when a sintered material is sinter bonded to the bottom face of a cylinder block for hydraulic pumps and motors (described later).

(2) Less tool abrasion occurs in machining.

The biggest problem in the above-described stable sinter bonding of a bronze based powder is entrapment of various gasses generated from the sintered material. The main hindrances to sinter bonding are: (1) Gas generation subsequent to an emergence of a liquid phase, particularly in the temperature range of about 700° C. or more, in the process of increasing density while allowing an emergence of the Cu—Sn liquid phase; (2) Swelling of a sintered compact due to entrapment of the gas generated by proper compaction; and (3) A compaction hindrance phenomenon caused by, for instance, choking of the Sn melt-off pores. The choking of the pores within the sintered compact caused by a sudden shrinkage during sintering can be prevented by dispersing ceramics particles as described earlier. In the invention, in order to attain air permeability for coping with the rapid gas generation caused by the generation of a liquid phase, elements are added which exhibit strong reduction and cause expansion of a sintered compact at 700 to 850° C. at which the rapid liquid phase generation occurs, thereby forming air holes for the gas. More concretely, the compaction hindrance phenomenon is prevented by respectively adding the elements, Ti, Cr, Fe, FeP (phosphor iron), Si and Al. And, the amount of Sn is set to 1 to 15 wt % on the assumption that the liquid phase which affects bonding at the time of sinter bonding is generated by addition of Sn in the form of a Cu—Sn based alloy. In addition, the temperature of sinter bonding is determined to be equal to or more than the peritectic temperature (about 800° C.) of Cu—Sn binary alloys with a view to prevent bonding defects in sinter bonding of a sintered compact which has been compacted after expansion at 700° C. or more to ensure bondability.

The elements Ti, Cr, Fe, FeP (phosphor iron), Si and Al which improve sinter bondability have good affinity with respect to iron and act as a ferrite generating element for steel. In addition, they function to eliminate or mitigate the transformation expandability of steel caused by cooling the steel's sintered joint surface. These features apparently realize stable sinter bondability. The Sn contained in steel functions as a ferrite generating element for steel but repels iron so that the ability of Sn to diffusively penetrate into steel is insignificant and therefore Sn does not work effectively in formation of the ferrite phase at the sintered bonding interface. From the same point of view, Co, V, Zr etc. have the same function and are therefore included in the scope of the invention.

Regarding addition of Ti, Cr, Si, Al etc., they may be added in the form of a primary powder or alternatively in the form of a master alloy powder or intermetallic compound powder (e.g., NiAl, NiTi, CoAl and $Ni_2Si$) containing each of these elements.

In a double layered sintered member such as engine metals and wrapping bearings formed by dispersing a mixed powder of bronze based and/or lead bronze based sintered material onto a steel plate; sinter bonding the power to the steel plate at 810° C. or more (first sintering); and mechanically increasing the density of the sintered dispersion layer to carry out resintering (second sintering), the layer of the mixed powder applied by the first sintering tends to peel off the steel plate owing to sinter shrinkage. This problem is solved by adding Si, Al, Ti, Cr which are capable of expanding the sintered layer and/or one or more kinds of non-metallic particles (oxides, carbides, nitrides and solid lubricants) which are capable of restraining the shrinkage of the sintered layer. Thanks to this technique, the production method is applicable to bronze based sintered contact materials that do not contain Pb, a metal having a low melting point.

Further, the inventors have studied how to add Sn in order to restrain the sinter shrinkage of the dispersion layer having a composition of a bronze based sintered contact material and found the following technique: A Cu—Sn based alloy powder at least containing Sn in an amount more than Cu—30 wt % Sn and/or an Sn primary powder are used. The powder which is the source of Sn is first melted in the first sintering, reacting to the surrounding Cu and/or the Cu—Sn based alloy powder containing 12 wt % or less Sn, whereby the sintered dispersion layer is expanded while forming β, γ, ζ, δ, ε and η phases (see the Hansen's Cu—Sn binary phase diagram). Thus, sinter bondability is more effectively achieved.

BRIEF EXPLANATION OF THE DRAWINGS

FIGS. 3(a), (b), (c) and (d) are photographs showing the metallographic structures of Cu—Ni—Si based sintered compacts.

BEST MODE FOR CARRYING OUT THE INVENTION

Figure 1:
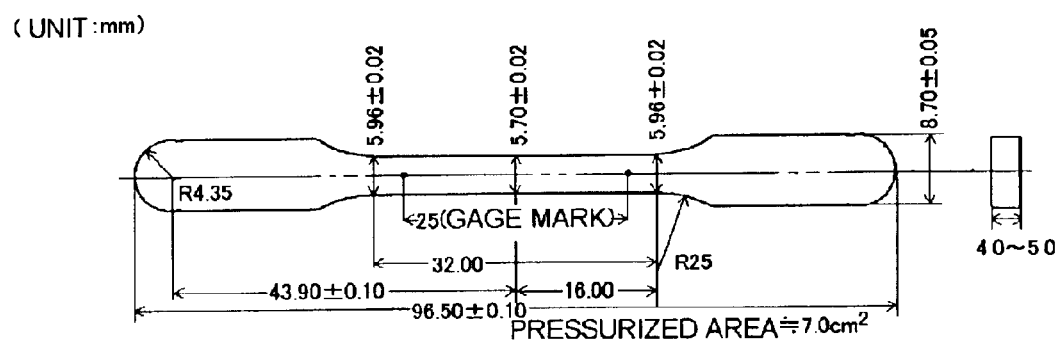
FIG. 1 shows a shape of a compact used as a tensile test specimen.

Referring now to the drawings, examples of the copper based sintered contact material and double layered sintered contact member of the invention will be concretely described below.

EXAMPLE 1

The mixed powders shown in TABLE 4 were prepared using an electrolytic Cu powder (CE25, CE15); Si, TiH powders of #300 mesh or less; phosphor iron (Fe 25 wt % P); $NiAl_3$; Ni, Fe powders having an average particle diameter of 5 μm; an Fe 48 wt % Co powder having an average particle diameter of 9.8 μm; an $SiO_2$ powder having an average diameter of 21 μm; a zircon sand ($ZrO_2$ $SiO_2$) powder having an average particle diameter of 23 μm; $Al_2O_3$ powders having average particle diameters of 2 μm and 24 μm, respectively; a $ZrB_2$ powder having an average particle diameter of 1 μm; a W, Mo, TiN powder; an MnS powder having an average particle diameter of 1.2 μm; and an artificial graphite (SGO) powder having an average particle diameter of 50 μm. These mixed powders were pressed at a compacting pressure of 2 to 5 ton/cm², thereby forming green compacts. The green compacts thus formed were respectively sintered in an atmosphere of Ax gas (ammonia cracked gas) having a dew point of 35° C. or less. It should be noted that the CuNiSi ternary sintered compacts shown in TABLE 4 were respectively prepared with an Ni to Si weight ratio of 3:1 and allowed to have high strength by precipitation of an Ni₂Si based intermetallic compound. For checking strength after sintering, the mixed powders were respectively subjected to compaction and sintering to form tensile test specimens having the shape shown in FIG. 1. With these test specimens, tensile tests were conducted.

TABLE 4

| No. | CE25 | Ni | Si | ZrB₂ | Al₂O₃—1 | Al₂O₃—2 | FeP | SGO | MnS | Mo |
|---|---|---|---|---|---|---|---|---|---|---|
| A1 | Bal. | 1.5 | 0.5 | | | | | | | |
| A2 | Bal. | 1.5 | 0.5 | 0.3 | | | | | | |
| A3 | Bal. | 1.5 | 0.5 | | 0.3 | | | | | |
| A4 | Bal. | 1.5 | 0.5 | | | 0.3 | | | | |
| A5 | Bal. | 1.5 | 0.5 | | | | 1.5 | | | |
| A6 | Bal. | 1.5 | 0.5 | 0.3 | | | 1.5 | | | |
| A7 | Bal. | 1.5 | 0.5 | | 0.3 | | 1.5 | | | |
| A8 | Bal. | 1.5 | 0.5 | | 0.3 | | | 0.75 | | |
| A9 | Bal. | 1.5 | 0.5 | | 0.3 | | | | 1 | |
| A10 | Bal. | 1.5 | 0.5 | | 0.3 | | 1.5 | 0.75 | | |
| A11 | Bal. | 1.5 | 0.5 | | 0.3 | | 1.5 | | 1 | |
| A12 | Bal. | 2.25 | 0.75 | | | | | | | |
| A13 | Bal. | 2.25 | 0.75 | 0.3 | | | | | | |
| A14 | Bal. | 3 | 1 | | | | | | | |
| A15 | Bal. | 3 | 1 | 0.3 | | | | | | |
| A16 | Bal. | 3 | 1 | | 0.5 | | | | | |
| A17 | Bal. | 3 | 1 | | 0.7 | | | | | |
| A18 | Bal. | 3 | 1 | | | | 0.5 | | | |
| A19 | Bal. | 3 | 1 | | | | | | | 1 |
| A20 | Bal. | 3 | 1 | | | | | | | 2 |
| A21 | Bal. | 3 | 1 | | | | | | | |
| A22 | Bal. | 3 | 1 | | | | | | | |
| A23 | Bal. | 3 | 1 | | | | | | | |
| A24 | Bal. | 3 | 1 | | | | | | | |
| A25 | Bal. | 3 | 1.75 | | | | | | | |
| A26 | Bal. | 3 | | | | | | | | |
| A27 | Bal. | 3 | 1 | | | | | | | |
| A28 | Bal. | 4.5 | 1.5 | | | | | | | |
| A29 | Bal. | 6 | 2 | | | | | | | |
| A30 | Bal. | 10 | 3.33 | | | | | | | |
| A31 | Bal. | 10 | 3.33 | | | | | | | |
| A32 | Bal. | 10 | 3.33 | | | | | | | |
| A33 | Bal. | 4.5 | | | | | | | | |
| A34 | Bal. | 2 | | | | | | | | |
| A35 | Bal. | 3 | 1 | | | | | | | |
| A36 | Bal. | 3 | 1 | | | | | | | |
| A37 | Bal. | 3 | 1 | | | | | | | |
| COMPARATIVE EXAMPLE 1 | P31C | | | | | | | | | |
| COMPARATIVE EXAMPLE 2 | Al₂O₃ | | | | | | | | | |
| COMPARATIVE EXAMPLE 3 | ZrO₂ | | | | | | | | | |
| COMPARATIVE EXAMPLE 4 | SiO₂ | | | | | | | | | |
| COMPARATIVE EXAMPLE 5 | SiC | | | | | | | | | |
| COMPARATIVE EXAMPLE 6 | Si₃N₄ | | | | | | | | | |

| No. | W | SiO₂ | FeCo | Fe | TiH | NiAl₃ | ZrO₂SiO₂ | TiN | PV VALUE | Δ Wmm |
|---|---|---|---|---|---|---|---|---|---|---|
| A1 | | | | | | | | | 3000 | 0.19 |
| A2 | | | | | | | | | 1500 | 0.15 |
| A3 | | | | | | | | | 4000 | 0.02 |
| A4 | | | | | | | | | 1500 | 0.19 |
| A5 | | | | | | | | | 4000 | 0.08 |
| A6 | | | | | | | | | 3500 | 0.13 |
| A7 | | | | | | | | | 3000 | 0.32 |
| A8 | | | | | | | | | 4000 | 0.02 |
| A9 | | | | | | | | | 4500 | 0.01 |
| A10 | | | | | | | | | 1000 | 0.02 |
| A11 | | | | | | | | | 2000 | 0.02 |
| A12 | | | | | | | | | 4000 | 0.082 |
| A13 | | | | | | | | | 3000 | 0.14 |

TABLE 4-continued

| | | | | | | | |
|---|---|---|---|---|---|---|---|
| A14 | | | | | | 4500 | 0.09 |
| A15 | | | | | | 3000 | 0.12 |
| A16 | | | | | | 5000 | 0.04 |
| A17 | | | | | | 3000 | 0.11 |
| A18 | | | | | | 2500 | 0.16 |
| A19 | | | | | | 6000 | 0.1 |
| A20 | | | | | | 7000 | 0.12 |
| A21 | 1 | | | | | 6000 | 0.09 |
| A22 | 2 | | | | | 5500 | 0.07 |
| A23 | | 0.5 | | | | 6000 | 0.02 |
| A24 | | 1 | | | | 4000 | 0.045 |
| A25 | | | 1.5 | | | 6500 | 0.09 |
| A26 | | | | 1 | | 5000 | 0.08 |
| A27 | | | 5 | | | 7000 | 0.13 |
| A28 | | | | | | 6000 | 0.214 |
| A29 | | | | | | 7000 | 0.265 |
| A30 | | | | | | 5000 | 0.392 |
| A31 | 1 | | | | | 4000 | 0.241 |
| A32 | | 0.5 | | | | 4000 | 0.075 |
| A33 | | | 1.5 | | | 6500 | 0.06 |
| A34 | | | | 3 | | 6000 | 0.06 |
| A35 | | | | | 0.5 | 4500 | 0.07 |
| A36 | | | | | 1 | 5000 | 0.042 |
| A37 | | | | | 0.5 | 7000 | 0.052 |
| COMPARATIVE EXAMPLE 1 | | | | | | 5000 | 0.361 |
| COMPARATIVE EXAMPLE 2 | | | | | | 1600 | — |
| COMPARATIVE EXAMPLE 3 | | | | | | 2400 | — |
| COMPARATIVE EXAMPLE 4 | | | | | | 3600 | — |
| COMPARATIVE EXAMPLE 5 | | | | | | 3200 | — |
| COMPARATIVE EXAMPLE 6 | | | | | | 2800 | — |

Figure 2:
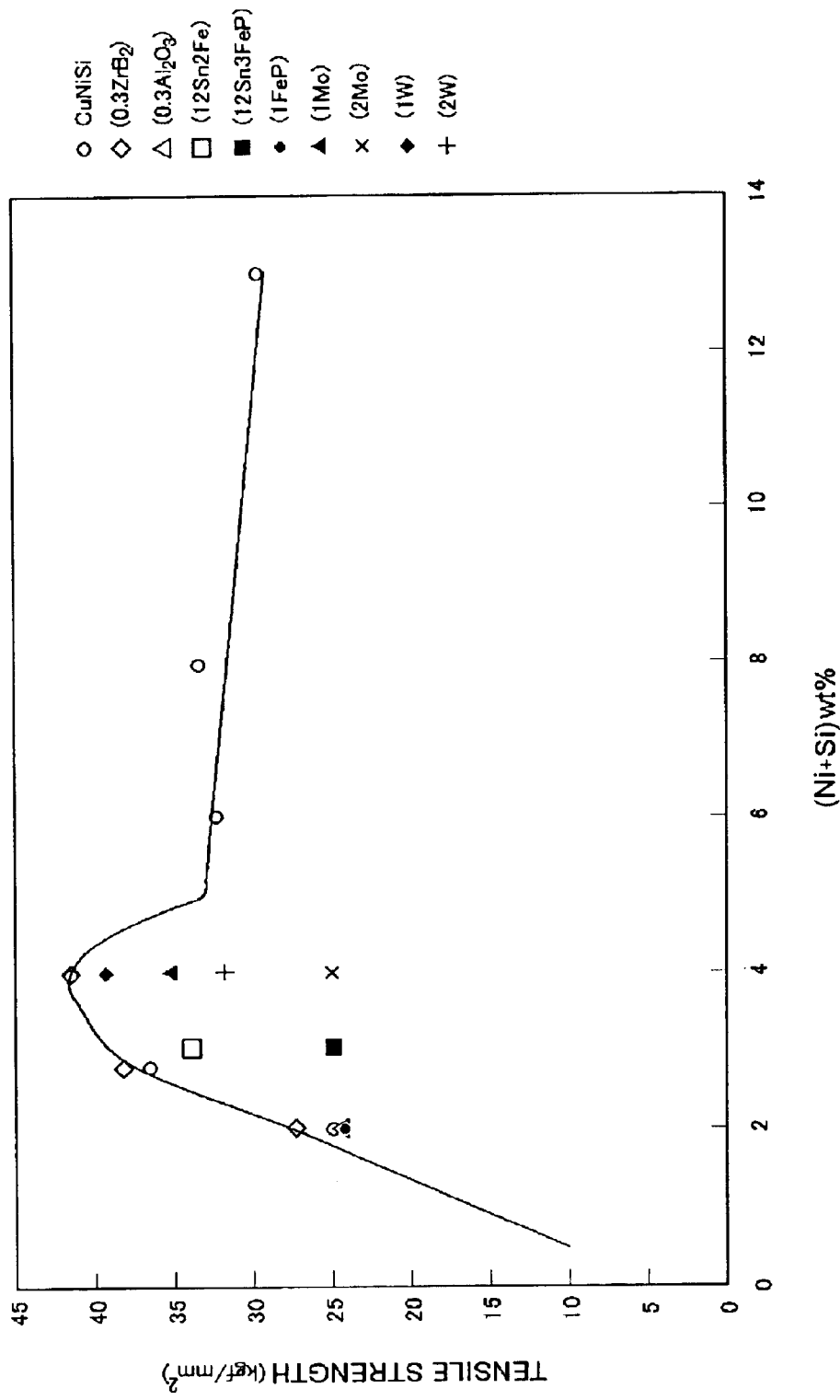
FIG. 2 is a graph showing the results of tests conducted for checking the tensile strength of CuNiSi and CuSnNiSi sintered materials.

FIG. 2 shows the results of the tensile tests. It will be understood from the graph of FIG. 2 that the maximum sinter strength (tensile strength) can be obtained by about 4 wt % (Ni+Si). However, if the amount of (Ni+Si) exceeds 4 wt %, fine $Ni_2Si$ compounds precipitate in the sintered material as shown in the structural photographs of FIG. 3, and as the amount of (Ni+Si) increases, larger intermetallic compounds precipitate in the grain boundary, resulting in a decrease in strength. As seen from FIG. 2 and TABLE 4, a significant decrease in strength was not observed when adding hard particles such as $ZrO_2$, $SiO_2$, $Al_2O_3$–1, phosphor iron (Fe 25P), Fe, Mo and W in amounts of about 2 wt % or less. It can be understood from the comparison between No. A3 and No. A9 and between No. A7 and No. A11 in TABLE 4 that the significant decrease of strength when soft MnS (density=5.23; quantity=1.7% by volume) is added is a very serious problem. It can however be understood from the comparison between No. A3 and No. A8 and between No. A7 and No. A10 in TABLE 4 that even though soft particles are used, a drop in strength can be reduced where graphite (SGO) having an average particle diameter of 50 μm is added in an amount of 0.75 wt % (density=2.0; quantity=3.3% by volume). Therefore, it is apparent that use of coarse particles (e.g., granules) is desirable for MnS.

Figure 4:
FIG. 4 is a photograph showing the metallographic structure of a Cu-3Ni-1Si-0.5$SiO_2$ based sintered compact.

FIG. 4 shows a structural photograph of a sintered compact of the powder No. 23 shown in TABLE 4. $SiO_2$ particles having a particle diameter of 10 μm or less are dispersed, being entrapped within the matrix due to the shift of the grain boundary during sintering, whereas most of $SiO_2$ particles having a size of more than 10 μm are dispersed within the grain boundary. Therefore, it is obvious that a decrease in the strength of the sintered compact can be restrained by adjusting most of $SiO_2$ particles to 10 μm or less. Apparently, CuNiTi, CuTiSi and CuNiAl based materials may be used as a high-strength copper based sintered material similar to the above-described CuNiSi based material. In this case, the Ni to Ti ratio, Ti to Si ratio and Ni to Al ratio are preferably within the range of from 4:1 to 3:1.

Figure 5:
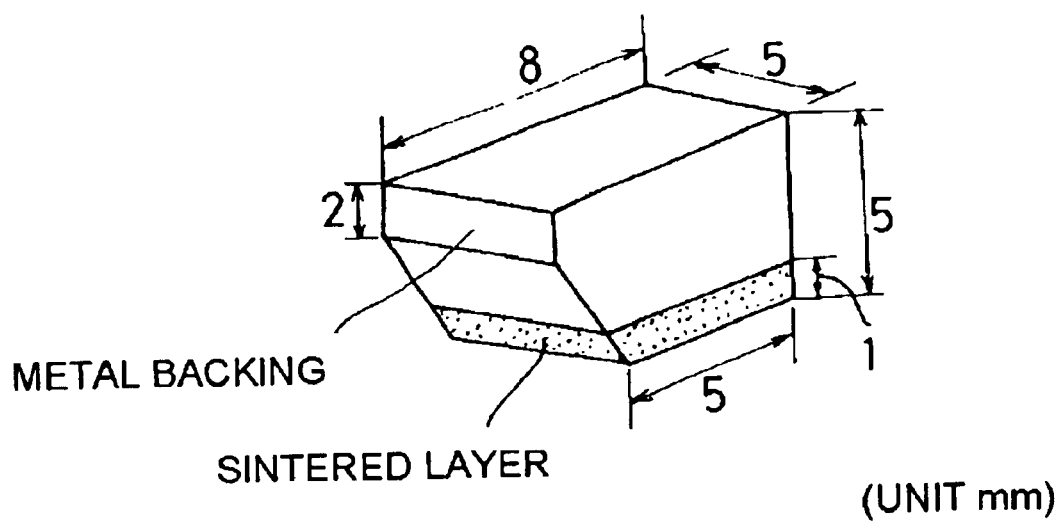
FIG. 5 shows a shape of a specimen for constant rate friction abrasion tests.

Next, constant rate friction abrasion tests were conducted using sliding test specimens such as shown in FIG. 5 in order to check the sliding properties of the copper based sintered materials. Specifically, the PV value representative of the product of a pressing force (kgf/cm$^2$) and sliding speed (m/sec) at the time when a friction coefficient rapidly increases or when a sudden abnormal wear occurs and the wear amount ΔW (mm) of each test specimen at that time were measured. The results of the tests are also shown in TABLE 4. The test condition is as follows: As a mating material for each specimen, SCM420 was used, which had been subjected to thermal treatment of carburizing, quenching and tempering such that its surface had a Rockwell hardness of HRC 60. While the #10 lubricant having a temperature of 80° C. being supplied at a rate of 100 cc/min, the mating material is rotated with the sliding speed being 10 m/sec. Under this condition, each specimen was tested for ten minutes and this test was repeated until the limit the specimen can withstand was reached. Then, the PV value inherent to the contact material and the wear amount of the specimen were measured.

It has been found from the comparison among the sliding properties (PV values) of the CuNiSi ternary materials (Nos. A1, A12, A14 and A28 to A30) that the PV values start to be improved to a considerable extent from the point where Ni+Si=4 wt %; achieve their maximum improvement at the point where Ni+Si=9.33 wt %; and start to drop after the point where Ni+Si=9.33 wt %. As seen from the sintered compact structures shown in FIG. 3, this change is attributable to the fact that when Ni and Si are added in an amount of 4 wt % or more, an extremely fine NiSi intermetallic compound starts to precipitate within the sintered compact, leading to a considerable improvement in the PV value and when Ni and Si are added in an amount of 13.3 wt %, an extremely coarse intermetallic compound precipitates within the grain boundary leading to a decrease in the PV value. It is also understood that since the volume percentage of the intermetallic compound is 100% when Ni+Si=100 wt %, Ni+Si=13.33 can be approximated by about 10% by volume and, therefore, the volume of the dispersed NiSi based intermetallic compound is preferably 10% by volume or less. Further, Ni+Si is preferably used in an amount of 6% by volume which is equivalent to Ni+Si=9.33 wt % because with this amount, a large amount of a coarse intermetallic compound does not precipitate.

It was found from an investigation on the effect of $Al_2O_3$ serving as the hard particles that addition of fine $Al_2O_3$ ($Al_2O_3$–1) prevents a drop in the PV value and improves wear resistance, whereas addition of $Al_2O_3$ ($Al_2O_3$–1) in an amount of 0.5 wt % or more leads to a drop in the PV value. When coarse $Al_2O_3$ ($Al_2O_3$–2) was added in an amount of 0.3 wt %, a significant drop in the PV value was observed. A considerable improvement was observed in both the PV value and wear resistance in the coexistence of $Al_2O_3$–1 and a solid lubricant such as graphite (SGO) or MnS.

The effect of addition of $SiO_2$ particles and $ZrO_2$ $SiO_2$ was observed in the powders Nos. A23, A24, A35 and A36. Concretely, even when they were coarse particles, the PV value and wear resistance could be improved when the amount of these particles was up to 1.0 wt %, and particularly the improvement achieved by addition of $SiO_2$ was significant when its amount was 0.5 wt %. In addition, virtually no attacks on the mating material was detected even when they were coarse particles.

It was confirmed by the powder No. A37 that addition of TiN particles had the effect of considerably improving the sliding properties.

The considerable PV value improving effect of Mo, W, Fe addition was confirmed by the powders No. A19 to A22 and A25. Since the metallic particles of Mo and W are originally not hard particles, they have a little effect of improving wear resistance. Part of the metallic particles of Fe reacts to Si contained in a CuNiSi based material, thereby forming a hard FeSi based intermetallic compound so that wear resistance is improved. In the powder No. A27, an FeCo ordered alloy powder is used in place of Fe and substantially the same degree of improvement in the PV value and wear resistance has been confirmed. It is also apparent that where a hard martensitic Fe—C alloy is dispersed, a considerable improvement in wear resistance can be expected.

The test results of the CuNiTi and CuNiAl based materials (Nos. A26, A33 and A34) serving as a high-strength copper based sintered material similar to the CuNiSi based material are shown and proved to have excellent sliding properties similar to those of the CuNiSi based material.

As a comparative example for the high-strength contact materials, the sliding properties of P31C (Comparative Example 1: Cu-28Zn-3Ni-4Al-1Si-0.7Fe-0.6Co) are shown. P31C is a high-strength cast material having excellent wear resistance and containing a large amount of an intermetallic compound within a hard matrix comprised of α and β phases. It is understood that the high-strength copper based sintered contact materials of the invention have much better properties than this comparative material. The result of EPMA (analysis by use of an X-ray micro analyzer) conducted on the intermetallic compound dispersing in Comparative Example 1 is shown in TABLE 5. The intermetallic compound (Ni, Co, Fe)(Al, Si) within the P31C material is a composite intermetallic compound in which two kinds of intermetallic compounds, i.e., Al rich and Si rich intermetallic compounds are dispersed. Ni is rich in the Al rich intermetallic compound, whereas Fe and Co are rich in the Si rich intermetallic compound.

TABLE 5

The chemical composition of the intermetallic compound dispersing in the annealed structure of P31C (mol %)

| Ni | Co | Fe | Cu | Al | Si | Zn |
|---|---|---|---|---|---|---|
| 22.6 | 14.7 | 15.8 | 6.5 | 22.4 | 15.2 | 2.8 |
| 31.6 | 9.06 | 6.16 | 8.87 | 31.4 | 9.13 | 3.76 |

It is assumed from the result that the poor wear resistance of Comparative Example 1 is attributable to the likelihood that the matrix of P31C agglutinates, while the excellent wear resistance of the sintered contact material of the invention is attributable to the presence of oil impregnated pores although the number of pores is small.

An investigation was also conducted to check the sliding properties of each of ceramics materials such as $Al_2O_3$ (Comparative Example 2), $ZrO_2$ (Comparative Example 3), $SiO_2$ (Comparative Example 4), SiC (Comparative Example 5), and $Si_3N_4$ (Comparative Example 6). In this investigation, each sliding test specimen was finished so as to have a surface roughness of Rmax=1 μm or less. As seen from TABLE 4, their sliding properties were not as good as they were expected under a high sliding speed condition (10 m/sec), but the higher thermal shock resistance, the better sliding properties. Among them, $Al_2O_3$ revealed the disadvantages that its surface roughness Rmax after the sliding test was as high as 5 to 15 μm, that chipping due to thermal shocks was clearly found on the sliding contact surface, and that it forcefully attacked on its mating material. However, it was found that seizure did not occur at a maximum surface pressure of 800 kgf/cm² and the $Al_2O_3$ material could slide with a low friction coefficient on condition that the $Al_2O_3$ material slid at a sliding speed of 2.5 m/sec or less and is not subjected to a load caused by thermal shocks because of local agglutination.

EXAMPLE 2

This example is associated with an investigation conducted on Cu—Sn bronze based sintered contact materials to which lead is added in amounts up to 3 wt %. The sintered contact materials used in this example were produced in the following way: The mixed powders shown in TABLE 6 were prepared using, in addition to the raw powder materials used in Example 1, Sn, Pb, Al, cemented carbide and Cu—30 wt % Zn which have a size of #250-mesh or less and Cr, Mn, MnSi, TiSi which have a size of #300-mesh or less. These powders were compacted at a compacting pressure of 2 ton/cm² to form green compacts and then, the green compacts were respectively sintered in an atmosphere of AX gas (ammonia cracked gas) having a dew point of 35° C. or less. The sintering temperature varied depending on the compositions of the materials but ranged from 850 to 900° C. The sliding properties (PV value, ΔW) evaluated in the same way as in Example 1 are shown in TABLE 6.

TABLE 6

| No. | CE15 | Sn | Pb | FeP | TiH | Ni | Si | Al | Zn | SiO₂ | NiAl₃ | Mn | Fe | Co | MnSi | TiSi | CEMENTED CARBIDE | Cr | PV VALUE | Δ Wmm |
|---|---|---|---|---|---|---|---|---|---|---|---|---|---|---|---|---|---|---|---|---|
| B1 | Bal. | 10 |  | 0 |  |  |  |  |  |  |  |  |  |  |  |  |  |  | 5000 | 0.19 |
| B2 | Bal. | 10 | 3 | 0 |  |  |  |  |  |  |  |  |  |  |  |  |  |  | 8000 | 0.24 |
| B3 | Bal. | 10 | 3 | 0.55 |  |  |  |  |  |  |  |  |  |  |  |  |  |  | 8000 | 0.09 |
| B4 | Bal. | 10 | 3 | 1.5 |  |  |  |  |  |  |  |  |  |  |  |  |  |  | 6500 | 0.02 |
| B5 | Bal. | 10 | 3 | 3 |  |  |  |  |  |  |  |  |  |  |  |  |  |  | 3000 | 0.08 |
| B6 | Bal. | 10 | 3 |  | 2 |  |  |  |  |  |  |  |  |  |  |  |  |  | 8000 | 0.05 |
| B7 | Bal. | 10 | 3 | 1.5 | 2 |  |  |  |  |  |  |  |  |  |  |  |  |  | 7500 | 0.01 |
| B8 | Bal. | 10 | 3 | 3 | 2 |  |  |  |  |  |  |  |  |  |  |  |  |  | 4500 | 0.06 |
| B9 | Bal. | 10 | 3 |  | 0.65 | 2.4 |  |  |  |  |  |  |  |  |  |  |  |  | 5500 | 0.03 |
| B10 | Bal. | 10 | 3 |  | 1.1 |  | 0.4 |  |  |  |  |  |  |  |  |  |  |  | 5000 | 0.02 |
| B11 | Bal. | 10 | 3 | 3 | 1.1 |  | 0.4 |  |  |  |  |  |  |  |  |  |  |  | 3500 | 0.09 |
| B12 | Bal. | 10 | 3 |  | 3 |  |  | 2 |  |  |  |  |  |  |  |  |  |  | 6500 | 0.08 |
| B13 | Bal. | 10 | 3 | 3 |  |  | 3 | 1 |  |  |  |  |  |  |  |  |  |  | 4000 | 0.03 |
| B14 | Bal. | 10 | 3 |  |  |  | 3 | 1 |  |  |  |  |  |  |  |  |  |  | 8000 | 0.09 |
| B15 | Bal. | 10 | 3 |  |  |  | 4.5 | 1.5 |  |  |  |  |  |  |  |  |  |  | 7000 | 0.17 |
| B16 | Bal. | 10 | 3 | 0.55 |  | 10 |  |  |  |  |  |  |  |  |  |  |  |  | 6000 | 0.04 |
| B17 | Bal. | 10 | 3 | 0.55 |  | 20 |  |  |  |  |  |  |  |  |  |  |  |  | 4500 | 0.08 |
| B18 | Bal. | 5 | 3 | 0.55 |  |  |  |  | 15 |  |  |  |  |  |  |  |  |  | 5500 | 0.08 |
| B19 | Bal. | 5 | 3 |  |  |  | 3 | 1 | 15 |  |  |  |  |  |  |  |  |  | 6000 | 0.06 |
| B20 | Bal. | 5 | 3 | 0.55 |  |  |  |  | 21 |  |  |  |  |  |  |  |  |  | 6000 | 0.06 |
| B21 | Bal. | 5 | 3 |  |  |  | 3 | 1 | 21 |  |  |  |  |  |  |  |  |  | 8500 | 0.02 |
| B22 | Bal. | 14 | 3 | 0.55 |  |  |  |  |  |  |  |  |  |  |  |  |  |  | 7000 | 0.11 |
| B23 | Bal. | 16 | 3 | 0.55 |  |  |  |  |  |  |  |  |  |  |  |  |  |  | 6000 | 0.09 |
| B24 | Bal. | 10 | 3 | 0.55 |  |  |  |  |  | 0.3 |  |  |  |  |  |  |  |  | 7000 | 0.01 |
| B25 | Bal. | 10 | 3 |  |  |  |  |  |  |  | 1.5 |  |  |  |  |  |  |  | 7000 | 0.02 |
| B26 | Bal. | 10 | 3 |  |  |  |  |  |  |  | 3 |  |  |  |  |  |  |  | 7500 | 0.02 |
| B27 | Bal. | 10 | 3 |  |  |  | 1 |  |  |  |  | 3 |  |  |  |  |  |  | 3500 | 0.11 |
| B28 | Bal. | 10 | 3 |  |  |  |  |  |  |  |  |  | 2 | 2 |  |  |  |  | 7000 | 0.05 |
| B29 | Bal. | 10 | 3 |  |  |  |  |  |  |  |  |  |  | 1 |  |  |  |  | 4000 | 0.13 |
| B30 | Bal. | 10 | 3 |  |  |  |  |  |  |  |  |  |  |  | 1 |  |  |  | 6500 | 0.11 |
| B31 | Bal. | 10 | 3 |  |  |  |  |  |  |  |  |  |  |  |  |  | 5 |  | 5500 | 0.06 |
| B32 | Bal. | 10 | 3 |  |  |  |  |  |  |  |  | 1 |  |  |  |  | 5 |  | 8500 | 0.02 |
| B33 | Bal. | 10 | 3 |  |  |  |  |  |  |  |  |  | 1 |  |  |  | 5 |  | 7500 | 0.04 |
| B34 | Bal. | 10 | 3 |  |  |  |  |  |  |  |  |  |  |  |  |  |  | 1 | 7500 | 0.12 |
| COMPARATIVE EXAMPLE 1 | PBC |  |  |  |  |  |  |  |  |  |  |  |  |  |  |  |  |  | 5000 | 0.21 |
| COMPARATIVE EXAMPLE 2 | LBC |  |  |  |  |  |  |  |  |  |  |  |  |  |  |  |  |  | 5500 | 0.39 |

It is understood from the tests conducted on the powders Nos. B1 to B5 shown in TABLE 6 that when the amount of phosphor iron is up to 1.5 wt %, the PV value is slightly improved with a considerable improvement in wear resistance, but when the amount of phosphor iron is 3 wt %, the PV value greatly decreases. Accordingly, the proper amount of phosphor iron added is less than 3 wt % and more preferably about 2 wt %.

The powders Nos. B6 to B8 shown in TABLE 6 were used for checking the effect of addition of phosphor iron. It was found that single addition of Ti gave the effect of promoting sinterability while allowing dispersion of fine Pb and that Ti took nitrogen from an AX gas atmosphere and carbon from an organic lubricant (0.7 wt % Acra Wax) which had been added to the mixed powder so that slight amounts of TiN and TiC were produced, contributing to achievement of improved wear resistance without degrading slidability. In the coexistence of Ti and phosphor iron, most of Ti precipitates as TiP or Ti$_2$P. In the mixed powder No. B7, substantially all the amount of P contained in phosphor iron reacted to produce Ti$_2$P while the remaining Ti dispersing within the sintered compact as Fe$_2$Ti, bringing about a considerable improvement in the PV value and wear resistance. The degradation of the sliding performance of the material No. 8 is apparently attributable to the presence of excessive phosphor iron.

Figure 6:
FIG. 6 shows a photograph of the metallographic structure of a Cu-10Sn-10Ni-0.55FeP-3Pb (B16) sintered compact.

The powders Nos. B9 to B15 were prepared from combinations of the high-strength elements which were studied in Example 1. It was found that addition of Ni in a high concentration created an eutectoid structure composed of an Ni—Sn based intermetallic compound such as shown in FIG. 6; considerably increased sintered compact hardness (about Hv=200); and markedly improved wear resistance rather than the PV value. In addition, it was found that a significant improvement in the PV value and wear resistance was not achieved by addition of Zn in a high concentration.

The powders Nos. B22 and B23 were prepared by dispersing a Cu—Sn intermetallic compound in a sintered contact material and an apparent improvement in the PV value was observed in these specimens. The powders Nos. B 24 to B34 were prepared by dispersing SiO$_2$, NiAl$_3$, MnSi, FeCo, TiSi, cemented carbide and Cr respectively. Except MnSi, an improvement in the PV value or wear resistance was observed.

EXAMPLE 3

This example is associated an investigation conducted on bronze based and lead bronze based sintered contact materials to which lead is added in amounts up to 25 wt %. The sintered contact materials used in this example were produced in the following way: The mixed powders shown in TABLES 7 and 8 were prepared using, in addition to the raw powder materials used in Example 1 and Example 2, KJ4 (25 wt % P—Cu alloy) of #250-mesh or less. These powders were compacted at a compacting pressure of 2 ton/cm² to form green compacts and then, the green compacts were respectively sintered in an atmosphere of AX gas (ammonia cracked gas) having a dew point of 35° C. or less. The sintering temperature varied depending on the compositions of the materials but ranged from 800 to 860° C.

materials containing other powders in addition to KJ4 are superior to those of the material No. D1 to which KJ4 is added alone. The reason for this is that the material No. D1 has very poor wear resistance and is susceptible to abnormal wear before seizing. Although the material No. D8 to which 1 wt % SiO₂ is added has much better properties than the material No. D1, SiO₂ addition on the quantitative level of the specimen No. D8 causes an emergence of the mating

TABLE 7

| | CE15 | | | | | | | | | | | | | 3.18 gr/cm³ | |
|---|---|---|---|---|---|---|---|---|---|---|---|---|---|---|---|
| No. | Cu | Sn | Pb | TiH | Ni | Si | SiO₂ | FeP | Mo | W | NiAl₃ | Fe | Co | CaF₂ | PV VALUE | Δ Wmm |
| C1 | Bal. | 11 | 1 | 0.15 | | | | | | | | | | | 5500 | 0.08 |
| C2 | Bal. | 11 | 3 | 0.15 | | | | | | | | | | | 6000 | 0.06 |
| C3 | Bal. | 11 | 5 | 0.15 | | | | | | | | | | | 6000 | 0.09 |
| C4 | Bal. | 11 | 8 | 0.15 | | | | | | | | | | | 6000 | 0.13 |
| C5 | Bal. | 11 | 10 | 0.15 | | | | | | | | | | | 5500 | 0.27 |
| C6 | Bal. | 11 | 10 | 1 | | | | | | | | 2 | | | 7500 | 0.04 |
| C7 | Bal. | 11 | 10 | | 3 | 1 | | | | | | | | | 7500 | 0.05 |
| C8 | Bal. | 11 | 10 | | | | 0.3 | | | | | | | | 8000 | 0.03 |
| C9 | Bal. | 11 | 10 | | | | | 1 | | | | | | | 6500 | 0.03 |
| C10 | Bal. | 11 | 10 | | | | | | 2 | | | | | | 6000 | 0.08 |
| C11 | Bal. | 11 | 10 | | | | | 1 | 2 | | | | | | 8000 | 0.02 |
| C12 | Bal. | 11 | 10 | | | | | | | 2 | | | | | 5500 | 0.08 |
| C13 | Bal. | 11 | 10 | | | | | 0.55 | | 2 | | | | | 7500 | 0.04 |
| C14 | Bal. | 11 | 10 | | | | | | | | 1.5 | | | | 8000 | 0.04 |
| C15 | Bal. | 11 | 10 | | | | | | | | 3 | | | | 7000 | 0.03 |
| C16 | Bal. | 11 | 10 | | | | | | | | | 2 | 2 | | 8000 | 0.03 |
| C17 | Bal. | 11 | 10 | | | | | | | | | | | 1 | 7500 | 0.05 |
| COMPARATIVE EXAMPLE 2 | LBC | | | | | | | | | | | | | | 5500 | 0.358 |

TABLE 8

| No. | Cu | Sn | Pb | Mo | W | SiO₂ | FeP | PV VALUE | Δ Wmm |
|---|---|---|---|---|---|---|---|---|---|
| D1 | Bal. | 0 | 25 | | | | | 5000* | >1.2 |
| D2 | Bal. | 0 | 25 | 2 | | | | 7000 | 0.72 |
| D3 | Bal. | 0 | 25 | 4 | | | | 7500 | 0.61 |
| D4 | Bal. | 0 | 25 | | 2 | | | 6500 | 0.75 |
| D5 | Bal. | 0 | 25 | | 4 | | | 7500 | 0.5 |
| D6 | Bal. | 0 | 25 | | | 0.3 | | 7500 | 0.37 |
| D7 | Bal. | 0 | 25 | | | 0.5 | | 7000 | 0.27 |
| D8 | Bal. | 0 | 25 | | | 1 | | 6500 | 0.18 |
| D9 | Bal. | 0 | 25 | | | | 0.55 | 6500 | 0.46 |
| D10 | Bal. | 0 | 25 | | | | 1.5 | 7500 | 0.21 |

*A limit at which abnormal wear occurs.

The materials Nos. C1 to C5 were used to check the effect of Pb addition on Cu-11Sn. Apparently, Pb provides excellent PV value reproducibility rather than an improved PV value, but significantly degrades wear resistance. Where any one of Fe+Ti (Fe₂Ti), Ni+Si (NiSi intermetallic compounds), SiO₂, phosphor iron, Mo, W, NiAl₃ and FeCo is added in addition to Pb, considerably improved wear resistance and, in consequence, an improved PV value can be achieved. It is understood particularly from the test results of the material Nos. C10 to C13 that improved wear resistance and an improved PV value can be ensured in the coexistence of Mo or W metallic particles and hard particles such as phosphor iron rather than in the single presence of Mo or W metallic particles. Accordingly, the PV value improving effect of Mo and W metallic particles can be achieved when they respectively coexist with the hard non-metallic particles.

Regarding the sintered contact materials containing KJ4 shown in TABLE 8, the PV values and wear resistance of the material-attack property. Accordingly, it is preferable to limit the amount of SiO₂ to less than 1.0 wt %.

When making comparison between the materials shown in TABLE 7 and the materials shown in TABLE 8, it is understood that the sintered materials made of the powders shown in TABLE 8 and having higher hardness achieve more significant improving effect. This clearly indicates that the force of peeling agglutinates by particle dispersion is insufficient in the case of soft sintered materials.

EXAMPLE 4

This example discusses a method of producing a double-layered sintered contact member in which a bronze based sintered contact material containing no lead is integrated with a steel plate (SPCC) serving as a metal backing. The sintered contact materials used in this example were prepared from the mixed powders shown in TABLE 9 which contained, in addition to the raw powder materials used in Examples 1, 2 and 3, Cu—10 wt % Sn, Cu—20 wt % Sn and Cu—33 wt % Sn which had a size of #250 mesh or less. Each copper based sintered powder material was dispersed onto a 3.5 mm thick metal backing such that the finished product had a thickness of 0.6 mm. This composite material was sintered at 820 to 860° C. in an RX gas atmosphere, rolled by a roller such that the thickness of the overall resulting sintered layer was 0.8 mm and then sintered again at 800 to 840° C. TABLE 9 shows cases where the copper based sintered material layer was not sinter-bonded but peeled off during the first sintering process or peeled off during the rolling process. It is understood from TABLE 9 that a considerable shrinkage occurred, accompanied with peeling of the copper based sintered material layer from the metal backing at the sintering temperature in the materials Nos. F1 and F2 prepared from only an alloy powder and the material No. F3 prepared from a copper powder and Cu20Sn alloy powder. As understood from the materials Nos. F4 to F7, sinter bonding was observed where a powder having an Sn concentration equal to or more than Cu33Sn was used.

The reason for this is as follows: In the temperature zone equal to or lower than the peritectic temperature (about 800° C.) of Cu—Sn alloy based materials, Cu33Sn or Sn melts during sintering, generating liquid phases essential for sinter bonding. These liquid phases start to react to the Cu powder so that various CuSn intermetallic compounds such as β, γ, ζ, δ and ε are formed. The expansion at the time of the formation of the CuSn intermetallic compounds hampers the shrinkage of the sintered material layer which is the cause of the peeling-off.

from the result that a significant improvement can be achieved by addition of the aforesaid sinter inhibitors (e.g., $Si_3N_4$) and expansion elements.

Each double-layered sintered contact member formed by sinter bonding a sintered material to a metal backing was rounded so as to have an inner diameter of 50 mm and an investigation was conducted to check peeling of the sintered layer from the metal backing and occurrence of cracking. Good results were obtained in all the members. Further, occurrence of peeling of the sintered layer and cracking was

TABLE 9

|  | Cu10Sn | Cu14Sn | Cu | Cu20Sn | Cu33Sn | Sn | Cu10Sn10Pb | $SiO_2$—2 | $Si_3N_4$ | $CaF_2$ | SGO | Cu40Al | $NiAl_3$ | Cr | SINTER BONDABILITY |
|---|---|---|---|---|---|---|---|---|---|---|---|---|---|---|---|
| F1 | 100 | | | | | | | | | | | | | | X |
| F2 | | 100 | | | | | | | | | | | | | X |
| F3 | | | Bal. | 50 | | | | | | | | | | | X |
| F4 | | | Bal. | | 31 | | | | | | | | | | Δ2/5 |
| F5 | | | Bal. | | | 8 | | | | | | | | | ○0/5 |
| F6 | | | Bal. | | | 11 | | 0.5 | | | | | | | ○0/5 |
| F7 | | | Bal. | | | 14 | | | | | | | | | ○0/5 |
| F8 | | | | | | | 100 | | | | | | | | Δ2/5 |
| F9 | | | | | | | Bal. | | 0.5 | | | | | | ○ |
| F10 | Bal. | | | | | | | 0.5 | | | | | | | X5/5 |
| F11 | | | Bal. | | 31 | | | 0.5 | | | | | | | ○ |
| F12 | Bal. | | | | | 4 | | | | | | | | | Δ2/5 |
| F13 | Bal. | | | | | 4 | | 0.5 | | | | | | | ○ |
| F14 | Bal. | | | | | 4 | | | 0.5 | | | | | | ○ |
| F15 | Bal. | | | | | 2 | | | | 1 | | | | | ○ |
| F16 | Bal. | | | | | 2 | | | | | 1 | | | | ○ |
| F17 | Bal. | | | | | 2 | | | | 1 | 1 | | | | ○ |
| F18 | Bal. | | | | | | | | | | | 1 | | | ○ |
| F19 | | Bal. | | | | | | | | | | | 2 | | ○ |
| F20 | | | Bal. | | 31 | | | 0.5 | | | | | | 1 | ○ |
| F21 | | | Bal. | | 31 | | | 0.3 | | | | | 1 | | ○ |
| F22 | | | Bal. | | 31 | | | 0.5 | | | | | 1 | | ○ |

In view of the above fact, it is very effective to add elements which actively hamper the shrinkage of the copper based sintered material layer. It is also desirable to add $SiO_2$, $Si_3N_4$, graphite and the like which retard the shrinkage of the sintered material layer or elements such as Al, Si, Ti and Cr which actively impart expandability. Single addition of Al or Si causes vigorous reaction to the atmosphere so that they are preferably added in alloy or intermetallic compound form. When adding Al, Si, Ti or Cr in the form of primary powder, the sintering atmosphere is preferably a good non-oxidized atmosphere such as AX gas atmosphere or vacuum atmosphere.

In the materials Nos. F8, F9 which are LBC bronze (Cu10Sn10Pb), Pb having a low melting point is contained in large amounts so that sinter bondability is ensured. However, the actual range of sintering temperature for the composition of the powder No. F8 is generally 780 to 810° C. and the control especially in the vicinity of the peritectic temperature (800° C.) is difficult, so that the atmosphere and the oxidation of the powder must be strictly controlled. In this example, the powders Nos. F8 and F9 were sinter bonded at 820° C. and peeling due to a considerable shrinkage occurred in the case of the powder No. 8. It is obvious checked after burnishing treatment subsequent to welding of the metal backing portion. As a result, it was found that a sound wrapping bearing could be produced from all the members.

EXAMPLE 5

Figure 7:
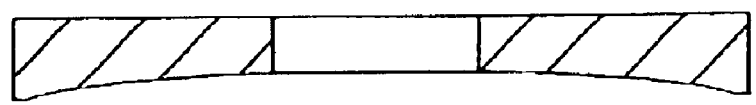
FIG. 7 shows a shape of a specimen for sinter bonding tests.

In this example, tests were conducted by respectively sinter bonding the above-described sintered contact materials to a steel (SCM440H) having the shape shown in FIG. 7. The sinter contact materials for bonding used as specimens were prepared by compacting the mixed powders shown in TABLE 10 at a compacting pressure of 2 ton/cm$^2$, the mixed powders being prepared from the raw powder materials described in Examples 1 to 4. Sinter bonding temperatures for the materials Nos. E1 to E17 and for the materials Nos. E18 and E19 in TABLE 10 were 860° C. and 1,070° C. respectively. After sinter bonding, the bonded area percentage (bondability) of each specimen was checked by use of an ultrasonic tester. The test results are also shown in TABLE 10.

TABLE 10

| No. | Cu | Sn | Pb | Ti | Cr | V | FeP | Ni | Mo | $SiO_2$ | $NiAl_3$ | $Ni_3Si$ | $CaF_2$ | Si | BONDABILITY |
|---|---|---|---|---|---|---|---|---|---|---|---|---|---|---|---|
| E1 | Bal. | 10 | 10 | | | | | | 2 | | | | | | 73.0% |
| E2 | Bal. | 10 | 10 | 0.5 | | | | | | | | | | | 97.0% |
| E3 | Bal. | 10 | 10 | 0.5 | | | | 1 | 2 | | | | | | 98.5% |

TABLE 10-continued

| No. | Cu | Sn | Pb | Ti | Cr | V | FeP | Ni | Mo | SiO$_2$ | NiAl$_3$ | Ni$_3$Si | CaF$_2$ | Si | BONDABILITY |
|---|---|---|---|---|---|---|---|---|---|---|---|---|---|---|---|
| E4 | Bal. | 10 | 10 | 0.5 | | | | 2 | | | | | | | 97.0% |
| E5 | Bal. | 10 | 10 | | 0.1 | | | 2 | | | | | | | 91.0% |
| E6 | Bal. | 10 | 10 | | 0.5 | | | 2 | | | | | | | 97.0% |
| E7 | Bal. | 10 | 10 | | 0.5 | 1 | | 2 | | | | | | | 98.0% |
| E8 | Bal. | 14 | 5 | | | | | 2 | | | | | | | 63.0% |
| E9 | Bal. | 14 | 5 | | 0.5 | | | 2 | 0.3 | | | | | | 91.0% |
| E10 | Bal. | 16 | 0 | | 0.5 | | | 2 | | | | | | | 94.0% |
| E11 | Bal. | 10 | 10 | | 0.5 | | | | | | 1.5 | | | | 99.5% |
| E12 | Bal. | 10 | 10 | | 0.5 | 1 | | | | | 1.5 | | | | 99.0% |
| E13 | Bal. | 10 | 10 | | 0.5 | | | | | 0.5 | 1.5 | | | | 99.5% |
| E14 | Bal. | 10 | 10 | | 0.5 | | | | | 0.3 | | 3 | | | 99.5% |
| E15 | Bal. | 10 | 10 | | 0.5 | 1 | | | | | | | 2 | | 98.0% |
| E16 | Bal. | 10 | 10 | | | | 0.5 | 2 | | | | | | | 95.0% |
| E17 | Bal. | 10 | 10 | | | | 0.5 | | | | 0.5 | | | | 99.0% |
| E18 | Bal. | | | | | | | 6 | 0.3 | | | | | 2 | 87.5% |
| E19 | Bal. | 1 | | | | | | 6 | 0.3 | | | | | 2 | 96.5% |
| COMPARATIVE EXAMPLE 4* | Bal. | 11 | 10 | | | | | 2 | | | | | | | CASTING |

It is understood from the test results of the materials Nos. E1, E2, E5, E6 and E16 that a considerable improvement in sinter bondability can be achieved by addition of small amounts of Ti, Cr and V and also achieved by addition of phosphor iron, SiO$_2$ and CaF$_2$. Addition of Si and Al which are the expansion elements of Ni$_3$Si and NiAl$_3$ considerably improves bondability by their venting effect exerted in the course of sintering. Phosphor iron, Si and Al are extremely desirable elements, because they have higher affinity with respect to steel than with respect to copper and stabilize the ferrite phase of iron so that the ferrite phase having a width of 20 μm or more is substantially uniformly formed on the bonding interface at the steel side and the peeling force imposed on the bonding interface by transformation-induced expansion in the cooling process after sinter bonding can be reduced to a great extent.

The chief components of the liquid phases emerging during sinter bonding are Sn and Pb. In this example, it has been found that even if Pb is not added, sound sinter bondability can be achieved by addition of small amounts of Cr, Si, Ti, phosphor iron etc. In the materials Nos. E18 and E19 which are sinter bondable in a high temperature zone, 1 wt % Sn significantly contributes to an improvement in bondability. In view of this and the percentage of bonded area, addition of Sn in an amount of 1 wt % or more is desirable.

EXAMPLE 6

In this example, the typical sintered contact materials described in Example 5 were respectively sinter bonded to the bottom face P of a cylinder block of a hydraulic pump ("HPV95" produced by Komatsu Limited.) and incorporated into a hydraulic pump. Then, a durability test was conducted in a real condition. A lead bronze based sintered contact material having a composition of Cu—10 wt % Sn—1 wt % Ti—2 wt % NiAl$_3$-5 wt % Pb—1 wt % FeP (phosphor iron) was sinter bonded to the inner circumference of the bore Q of the cylinder block used in the durability test.

Figure 8:
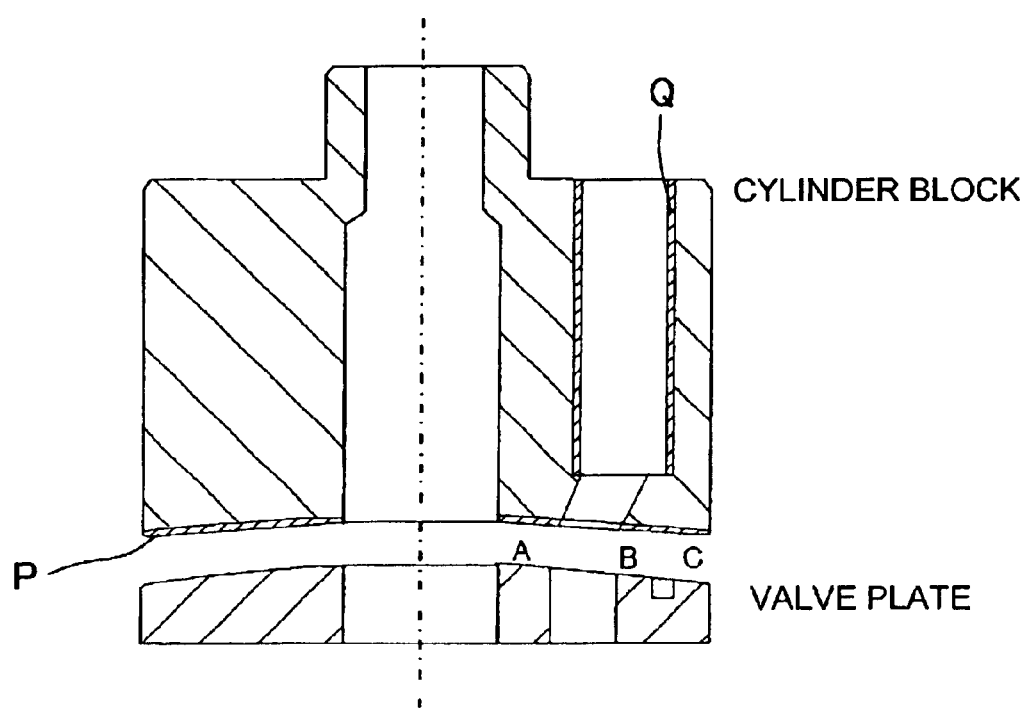
FIG. 8 shows shapes of a cylinder block and a valve plate used in a durability test.

The durability test was conducted for up to 300 hours with a rotational speed of 2,300 rpm and discharged hydraulic pressure of 420 kg/cm$^2$. A valve plate which served as the mating member for the cylinder block bottom face was prepared by carburizing an SCM420H material and then applying the mutual rubbing rapping treatment to the SCM420H material as well as to the cylinder block bottom face. Assuming that the cylinder block had already been used for a long time, the curvature of the bottom face was adjusted by the mutual rubbing rapping treatment such that the relationship between the contact rates of three sealed portions A, B, C (see FIG. 8) in the valve plate relative to the cylinder block was approximately represented by A:B:C= 1:1:0.2 and such that the cylinder block could whirl centrifugally during the durability test. After elapses of 50 hours, 100 hours and 300 hours in the test, the seizure of the bore of the cylinder block, the seizure and wear amount of the bottom face and the seizure and wear amount of the valve plate were measured. The result is shown in TABLE 11.

TABLE 11

| | TEST TIME (hr) | BOTTOM FACE SEIZURE | WEAR AMOUNT (μm) | WEAR AMOUNT (μm) |
|---|---|---|---|---|
| E2 | 50 | x | 17 | 5 |
| E3 | 50 | o | 5 | 4 |
| | 100 | x | 7 | 6 |
| E4 | 50 | x | 14 | 3 |
| E6 | 50 | o | 7 | 3 |
| | 100 | x | 16 | 4 |
| | 50 | o | 5 | 2 |
| E7 | 100 | o | 6 | 3 |
| | 300 | o | 9 | 6 |
| | 50 | o | 9 | 3 |
| E10 | 100 | o | 12 | 6 |
| | 300 | o | 18 | 9 |
| | 50 | o | 5 | 3 |
| E11 | 100 | o | 7 | 4 |
| | 300 | x | 12 | 8 |
| | 50 | o | 5 | 3 |
| E12 | 100 | o | 6 | 5 |
| | 300 | o | 9 | 8 |
| | 50 | o | 2 | 5 |
| E13 | 100 | o | 3 | 9 |
| | 300 | o | 5 | 15 |
| COMPARATIVE EXAMPLE 4 | 50 | o | 14 | 3 |
| | 100 | x | 26 | 5 |

It is understood from the result that the contact materials of the invention containing the non-metallic particles have durability superior to that of Comparative Example 4 and the materials Nos. E2 and E4. An improvement in wear resistance by dispersion of the hard particles is essential, particularly, in a high-speed sliding condition accompanied with vibration. For instance, it is understood from a comparison between the materials Nos. E4, E6 and E7 that both seizure resistance and wear resistance are markedly improved by the coexistence of Mo and the non-metallic particles. It is also understood from the material No. E13 that addition of $SiO_2$ contributes to an improvement in wear resistance while slightly increasing the mating material-attack property. Taking this into account, it is necessary to properly control the amount of $SiO_2$.

What is claimed is:

1. A copper based sintered contact material wherein non-metallic particles, comprised of one or more substances selected from the group consisting of oxides, carbides, nitrides and carbonitrides, have an average particle diameter of 45 μm or less and are dispersed in an amount ranging from 0.2% by volume or more to less than 4% by volume.

2. The copper based sintered contact material according to claim 1, wherein said oxides are thermal-shock-resistant, oxide-based ceramics comprising $SiO_2$ and/or one or two or more elements selected from the group consisting of Si, Al, Li, Ti, Mg and Zr.

3. The copper based sintered contact material according to claim 1, wherein said carbides, nitrides and carbonitrides comprise one or more substances selected from the group consisting of the carbides, nitrides and carbonitrides of W, Ti, Mo and V and/or cermet particles produced by sintering said substances with Co and/or Ni.

4. The copper based sintered contact material according to claim 1 or 2, wherein said non-metallic particles are in the form of granules and/or fibers.

5. The copper based sintered contact material according to any one of claims 1 to 3, wherein one or more metals and/or alloy particles selected from the group consisting of Mo, W, Cr, Go, Fe and Fe—C are dispersed in an amount of 0.5 to 5.0 wt %.

6. The copper based sintered contact material according to any one of claims 1 to 3, containing 1 wt % or less MnS and/or 1 wt % or less graphite.

7. The copper based sintered contact material according to any one of claims 1 to 3, containing 1 wt % or less MnS and/or 1 wt % or less graphite, wherein the average particle diameter of said MnS and/or graphite ranges from 20 to 200 μm or less.

8. The copper based sintered contact material according to any one of claims 1 to 3, containing at least 1 to 16 wt % Sn and 0 to 25 wt % Pb.

9. The copper based sintered contact material according to any one of claims 1 to 3, further containing 12 to 16 wt % Sn and a Cu—Sn compound phase which is dispersedly precipitated in the structure thereof.

10. The copper based sintered contact material according to any one of claims 1 to 3, containing at least 1 to 16 wt % Sn and 0 to 25 wt % Pb, further containing one or more alloy elements selected from the group consisting of Zn, Mn, Be, Mg, Ag, and Bi, and a solid lubricant such as $MoS_2$, $CaF_2$ and $WS_2$.

11. A double-layered sintered contact member produced by sinter bonding the copper based sintered contact material of any one of claims 1 to 3 to an iron based material.

12. A double-layered sintered contact member, which is produced by sinter bonding a pressed compact, formed from a sintered copper based contact material of any one of claims 1 to 3 and further containing Sn and/or Pb, to an iron based material, and wherein the sintered compact sinter bonded to the iron based material contains 0.1 to 2 wt % one or more elements selected from the group consisting of Cr, Si, Al, P and Ti which have more significant affinity with respect to iron than with respect to copper and stabilize the α phase of iron more than the γ phase of iron.

13. A double-layered sintered contact member produced by sinter bonding the copper based sintered contact material of any one of claims 1 to 3 to an iron based material, containing Si, Al, Ti and Cr which expand a sintered layer and/or one kind of non-metallic particles which restrains a shrinkage of a sintered layer, for fear that when using the double-layered sintered contact member which has been produced through a process in which a mixed powder having a sintered contact material composition and containing Sn and/or Pb is dispersed onto a steel plate, subjected to first sinter bonding at 810° C. or more, and then subjected to second sintering by mechanically increasing the density of the sintered dispersed powder layer, the layer of the mixed powder dispersed in the first sintering might peel off the steel plate owing to sinter shrinkage.

14. A double-layered sintered contact member produced by sinter bonding the copper based sintered contact material of any one of claims 1 to 3 to an iron based material, containing Si, Al, Ti and Cr which expand a sintered layer and/or one kind of non-metallic particles which restrains a shrinkage of a sintered layer, for fear that when using the double-layered sintered contact member which has been produced through a process in which a mixed powder having a sintered contact material composition and containing Sn and/or Pb is dispersed onto a steel plate, subjected to first sinter bonding at 810°0 C. or more, and then subjected to second sintering by mechanically increasing the density of the sintered dispersed powder layer, the layer of the mixed powder dispersed in the first sintering might peel off the steel plate owing to sinter shrinkage, wherein Sn is added by utilizing a Cu—Sn based alloy powder containing Sn in an amount no less than Cu—30 wt % Sn and/or Sn primary powder, so that the sintered layer in the first sintering is expanded.

15. The copper based sintered contact material according to any one of claims 1 to 3, further containing 12 to 16 wt % Sn and a Cu—Sn compound phase which is dispersedly precipitated in the structure thereof, further containing one or more alloy elements selected from the group consisting of Zn, Mn, Be, Mg, Ag, and Bi, and a solid lubricant such as $MoS_2$, $CaF_2$ and $WS_2$.

* * * * *

UNITED STATES PATENT AND TRADEMARK OFFICE
CERTIFICATE OF CORRECTION

PATENT NO. : 6,844,085 B2
DATED : January 18, 2005
INVENTOR(S) : Takemori Takayama et al.

It is certified that error appears in the above-identified patent and that said Letters Patent is hereby corrected as shown below:

<u>Tilte page,</u>
Item [73], Assignee, should read
-- [73] Assignee:   Komatsu, Ltd., JP --

<u>Column 35,</u>
Line 33, "Go" should read -- Co. --.
Line 54, "$MoS_{2,CaF2}$" should read -- $MoS_2, CaF_2$ --.

<u>Column 36,</u>
Line 40, "810°0C." should read -- 810°C. --.

Signed and Sealed this

Seventh Day of June, 2005

JON W. DUDAS
*Director of the United States Patent and Trademark Office*